(12) United States Patent
Mochizuki et al.

(10) Patent No.: US 7,196,692 B2
(45) Date of Patent: Mar. 27, 2007

(54) INPUT DEVICE PROVIDED WITH WINDABLE DISPLAY AND FOLDABLE KEYBOARD, AND PERSONAL COMPUTER PROVIDED WITH THE INPUT DEVICE

(75) Inventors: Isao Mochizuki, Kaizu-gun (JP); Takeyuki Takagi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 441 days.

(21) Appl. No.: 10/662,420

(22) Filed: Sep. 16, 2003

(65) Prior Publication Data

US 2004/0061683 A1 Apr. 1, 2004

(30) Foreign Application Priority Data

Sep. 30, 2002 (JP) ............................. 2002-285062
Sep. 30, 2002 (JP) ............................. 2002-285070
Sep. 30, 2002 (JP) ............................. 2002-285087

(51) Int. Cl.
*G09G 5/00* (2006.01)
(52) U.S. Cl. ...................................... 345/168; 345/905
(58) Field of Classification Search ................ 345/168, 345/905; 361/681
See application file for complete search history.

(56) References Cited

U.S. PATENT DOCUMENTS 4,341,980 A * 7/1982 Noguchi et al. ......... 315/169.1
6,734,809 B1 * 5/2004 Olodort et al. ............... 341/22
6,762,929 B2 * 7/2004 Sawyer ....................... 361/681

FOREIGN PATENT DOCUMENTS

JP          A 9-134132      5/1997
JP          A 10-293624     11/1998

* cited by examiner

*Primary Examiner*—Sumati Lefkowitz
*Assistant Examiner*—Rodney Amadiz
(74) *Attorney, Agent, or Firm*—Oliff & Berridge, PLC

(57) ABSTRACT

An input device 100 is structured such that a flexible display 102 is connected with a keyboard 1 through a control part disposed in a housing unit 101 only during use of the input device 100, in which a contact terminal 105 in the flexible display 102 is connected with a contact terminal 104 in a connector 103 which is electrically connected with a first and second keyboard units 3 and 4 when the flexible display 102 is drawn upward from the housing unit 101 through a slot 118 when required for use of the input device 100.

16 Claims, 16 Drawing Sheets

INPUT DEVICE PROVIDED WITH WINDABLE DISPLAY AND FOLDABLE KEYBOARD, AND PERSONAL COMPUTER PROVIDED WITH THE INPUT DEVICE

BACKGROUND OF THE INVENTION

1. Field of the Invention

The present invention relates to an input device provided with a foldable keyboard with superior portability and good operationality during use, and a personal computer provided with the input device. More specifically, the present invention relates to an input device and a personal computer, in which a flexible display can be housed or retracted in a compact rolled state in a housing unit and an electrical connection between the keyboard and the flexible display is enabled only during use of the input device and the personal computer.

The present invention further relates to an input device provided with a flexible display incorporating a resilient metallic thin plate, and a personal computer, capable of achieving improved portability during carrying and of providing good operationality during use equivalent to those of a desktop type input device and personal computer, and the flexible display being capable of being supported by itself without a dedicated supporting member or the like.

Furthermore, the present invention relates to an input device and a personal computer in which a housing unit for a flexible display is constructed to be detachably mounted to a keyboard and the housing unit and the keyboard are allowed to communicate with each other by wireless communication.

2. Description of Related Art

Heretofore, there have been proposed various types of portable electronic devices each including an input operating part, for example, a foldable keyboard, and a foldable display.

For example, Japanese patent unexamined publication No. Hei 10-293624 discloses a portable electronic device including a first unit mounting a display part and a second unit constructing an input operating part, wherein the first and second units are rotatably connected through a connecting part and the second unit includes a main part and two sub parts foldably connected with both sides of the main part through two connecting parts (See JP-A-10/293624, on page 2 and FIGS. 1 through 3).

In such portable electronic device, the main part and the sub parts are horizontally arranged during use, thereby providing a wide area as an inputting part and, on the other hand, the sub parts are folded to be superposed on the main part through the connecting parts during nonuse, thereby enhancing the portability.

Furthermore, Japanese patent unexamined publication No. Hei 9-134132 discloses an information processor and a display device therefor, in which a casing on which a keyboard is formed is attached with slide shafts which are rotatable about opening and closing parts, and a display supporting part is slidably attached to the slide shafts. Accordingly, the display supporting part is slid upward to widen a display, thereby unwinding a flexible liquid crystal display or an electroluminescence display from a winding shaft, and the display supporting part is pushed downward to reduce the size of the display, causing the display to be wound on the winding shaft (see JP-A-9/134132, on pages 2–3 and FIGS. 1 and 2).

In the portable electronic device disclosed in JP-A-10/293624, however, the two sub parts in the input operating part are constructed to be foldable so as to be superposed on the main part through the connecting parts, whereas the first unit including the display is not constructed in oneself to be foldable or windable into a compact state. Thus, the size of the electronic device must depend on the size of the first unit. This is still insufficient to further improve the portability of the electronic device and enhance the downsizing of the whole electronic device.

In the information processor and display device disclosed in JP-A-9/134132, on the other hand, the flexible liquid crystal display or electroluminescence display is wound on the winding shaft during nonuse and the display supporting part is slid upward during use to draw out or unwind the liquid crystal display or electroluminescence display from the winding shaft. Then, the liquid crystal display or electroluminescence display providing the display surface is connected to a controller through a flexible printed wiring sheet or the like. However, repeating the winding operation of the display may cause the connection between the display and the controller to come loose. Thus, reliability of connection between the display and the controller would be very low.

In the above devices, the liquid crystal display or electroluminescence display can not be supported so as to stand by itself due to own flexibility. Accordingly, the above devices need the slide shafts for supporting such displays and a dedicated supporting member or the like such as the slidable display supporting part. This results in a complicated display and peripheral structures and thus causes an increase in cost.

Furthermore, the liquid crystal display or electroluminescence display is not constructed to be detachable from the casing on which the keyboard is provided, and consequentially no structure for electrically connecting the display and the case is included. It is therefore obvious that the information processor and display device constructed as above have been proposed without taking a concept of separately placing the keyboard in the casing and the display during use into consideration. These devices are inappropriate as tools to be used for various presentations.

SUMMARY OF THE INVENTION

The present invention has been made in view of the above circumstances and has an object to overcome the above problems and to provide an input device provided with a flexible display, and a personal computer provided with the input device, in which the flexible display can be housed or retracted in a compact rolled state in a housing unit and the keyboard and the flexible display can electrically be connected only during use, thereby achieving improved portability of the input device and personal computer during carrying and providing good operationality during use equivalent to those of a desktop type input device and personal computer, and also maintaining high reliability of electrical connection between the keyboard and the flexible display.

Another object of the present invention is to provide an input device with a flexible display, and a personal computer provided with the input device, in which the flexible display can be housed or retracted in a compact rolled state in a housing unit and incorporates a resilient metallic thin plate, thereby achieving improved portability during carrying and providing good operationality during use equivalent to those of a desktop type input device and personal computer, and the flexible display can be supported to stand by itself without a dedicated supporting member or the like.

Furthermore, another object of the present invention is providing an input device and a personal computer in which a housing unit for a flexible display is constructed to be detachably mounted to a keyboard and the housing unit and the keyboard are allowed to communicate with each other by wireless communication, thereby achieving improved portability during carrying and providing good operationality during use equivalent to those of a desktop type input device and personal computer, and allowing the input device and personal computer to be used as tools for various presentations.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided an input device including: a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard; a housing main body disposed at one side of the first or second keyboard unit and formed with a hole in an upper surface; a flexible display which is windable so as to be housed in a rolled state in the housing main body during nonuse of the display and to be drawn upward from the housing main body through the hole during use of the display; a first contact terminal formed in the flexible display; and a connector which is electrically connected with the first and second keyboard units and provided with a second contact terminal, the first contact terminal being connected with the second contact terminal of the connector when the flexible display is drawn upward from the housing main body through the hole for use of the flexible display.

In the above input device, the first contact terminal formed in the flexible display is connected with the second contact terminal of the connector electrically connected with the first and second keyboard units when the flexible display is drawn (unwound) upward from the housing main body through the hole thereof during use of the input device, so that the flexible display and the keyboard can be connected with each other only when needed for use. Accordingly, the flexible display constructed to be windable so as to be housed in a rolled state in the housing main body can prevent the occurrence of loose connection which would often be caused if the keyboard and the flexible display are held in continuous connection. Thus, high reliability of electrical connection between the flexible display and the keyboard can be maintained.

According to another aspect, the present invention provides a personal computer including: a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard; a computer main body disposed at one side of the first or second keyboard unit; a housing main body disposed at one side of the computer main body and formed with a hole in an upper surface; a flexible display which is windable so as to be housed in a rolled state in the housing main body during nonuse of the display and to be drawn upward from the housing main body through the hole during use of the display; a first contact terminal formed in the flexible display; and a connector which is electrically connected with the first and second keyboard units and provided with a second contact terminal, the first contact terminal being connected with the second contact terminal of the connector when the flexible display is drawn out from the housing main body through the hole for use of the flexible display.

In the above personal computer, the first contact terminal formed in the flexible display is connected with the second contact terminal of the connector electrically connected with the first and second keyboard units when the flexible display is drawn (unwound) upward from the housing main body through the hole thereof when required for use of the input device, so that the flexible display and the keyboard can be connected with each other only when needed for use of the input device. Accordingly, the flexible display constructed to be windable so as to be housed in a rolled state in the housing main body can prevent the occurrence of loose connection which would often be caused if the keyboard and the flexible display are held in continuous connection. Thus, high reliability of electrical connection between the flexible display and the keyboard can be maintained.

According to another aspect, the present invention provides an input device including: a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard; a housing main body disposed at one side of the first or second keyboard unit and formed with a hole in an upper surface; a flexible display which is windable so as to be housed in a rolled state in the housing main body during nonuse of the display and to be drawn out from the housing main body through the hole during use of the display; wherein the hole formed in the housing main body is a curved elongate hole having a predetermined curvature, and a resilient metallic thin plate is laminated to a rear side of the flexible display, the resilient metallic thin plate being formed to provide a curved surface of a curvature equal to the predetermined curvature of the hole.

In the above input device, the resilient metallic thin plate laminated to the rear side of the flexible display is formed providing a curved surface of the curvature equal to the predetermined curvature of the elongate hole formed in the housing main body. The flexible display drawn upward through the hole is supported by the curved resilient metallic thin plate and therefore can be held by itself in vertical condition while maintaining a substantially flat surface. Accordingly, the flatness of the flexible display can be retained without disposing any complicated retainers such as a frame around the flexible display. This make it possible to achieve the input device with a simplified structure and a reduced cost.

According to another aspect, furthermore, the present invention provides a personal computer provided with an input device, wherein the input device includes: a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard; a computer main body disposed at one side of the first or second keyboard unit; a housing main body disposed at one side of the computer main body and formed with a hole in an upper surface; a flexible display which is windable so as to be housed in a rolled state in the housing main body during nonuse of the display and to be drawn out from the housing main body through the hole during use of the display, and the hole formed in the housing main body is a curved elongate hole having a predetermined curvature, and a resilient metallic thin plate is laminated to a rear side of the flexible display, the resilient metallic thin plate being formed to provide a curved surface of a curvature equal to the predetermined curvature of the hole.

In the above personal computer, the resilient metallic thin plate laminated to the rear side of the flexible display is formed providing a curved surface of the curvature equal to the predetermined curvature of the elongate hole formed in the housing main body. The flexible display drawn upward through the hole is supported by the curved resilient metallic thin plate and therefore can be held by itself in vertical condition while maintaining a substantially flat surface. Accordingly, the flatness of the flexible display can be retained without disposing any complicated retainers such as a frame around the flexible display. This make it possible to achieve the input device with a simplified structure and a reduced cost.

According to another aspect, the present invention provides an input device including: a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard; a housing main body disposed at one side of the first or second keyboard unit and formed with a hole in an upper surface; a flexible display which is windable so as to be housed in a rolled state in the housing main body during nonuse of the display and to be drawn out from the housing main body through the hole during use of the display, wherein the housing main body is constructed to be attachable and detachable with respect to the first or second keyboard unit, and the keyboard and the flexible display in the housing main body are constructed so as to communicate with each other by wireless communication.

In the above input device, the housing main body which houses the flexible display is constructed to attachable and detachable with respect to the first or second keyboard unit, and also the keyboard unit and the flexible display can communicate with each other by wireless communication. Accordingly, the housing main body detached from the keyboard can be set in a place apart from the keyboard. In this separate condition, when the flexible display is drawn upward from the housing main body and the keyboard is operated as needed, the flexible display can display various kinds of information input with the keyboard. The thus constructed input device can be used as a tool for presentations with excellent portability. Since the keyboard and the flexible display can communicate with each other by wireless communication, a single keyboard allows simultaneous presentations in plural places if housing main bodies are set in respective places.

Furthermore, according to another aspect, the present invention provides a personal computer provided with an input device, wherein the input device includes: a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard; a computer main body disposed at one side of the first or second keyboard unit; a housing main body disposed at one side of the computer main body and formed with a hole in an upper surface; a flexible display which is windable so as to be housed in a rolled state in the housing main body during nonuse of the display and to be drawn out from the housing main body through the hole during use of the display, and the housing main body is constructed to be attachable and detachable with respect to the first or second keyboard unit, and the keyboard and the flexible display in the housing main body are constructed so as to communicate with each other by wireless communication.

In the above personal computer, the housing main body which houses the flexible display is constructed to attachable and detachable with respect to the first or second keyboard unit, and also the keyboard unit and the flexible display can communicate with each other by wireless communication. Accordingly, the housing main body detached from the keyboard can be set in a place apart from the keyboard. In this separate condition, when the flexible display is drawn upward from the housing main body and the keyboard is operated as needed, the flexible display can display various kinds of information input with the keyboard. The thus constructed personal computer can be used as a tool for presentations with excellent portability. Since the keyboard and the flexible display can communicate with each other by wireless communication, a single keyboard allows simultaneous presentations in plural places if housing main bodies are set in respective places.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
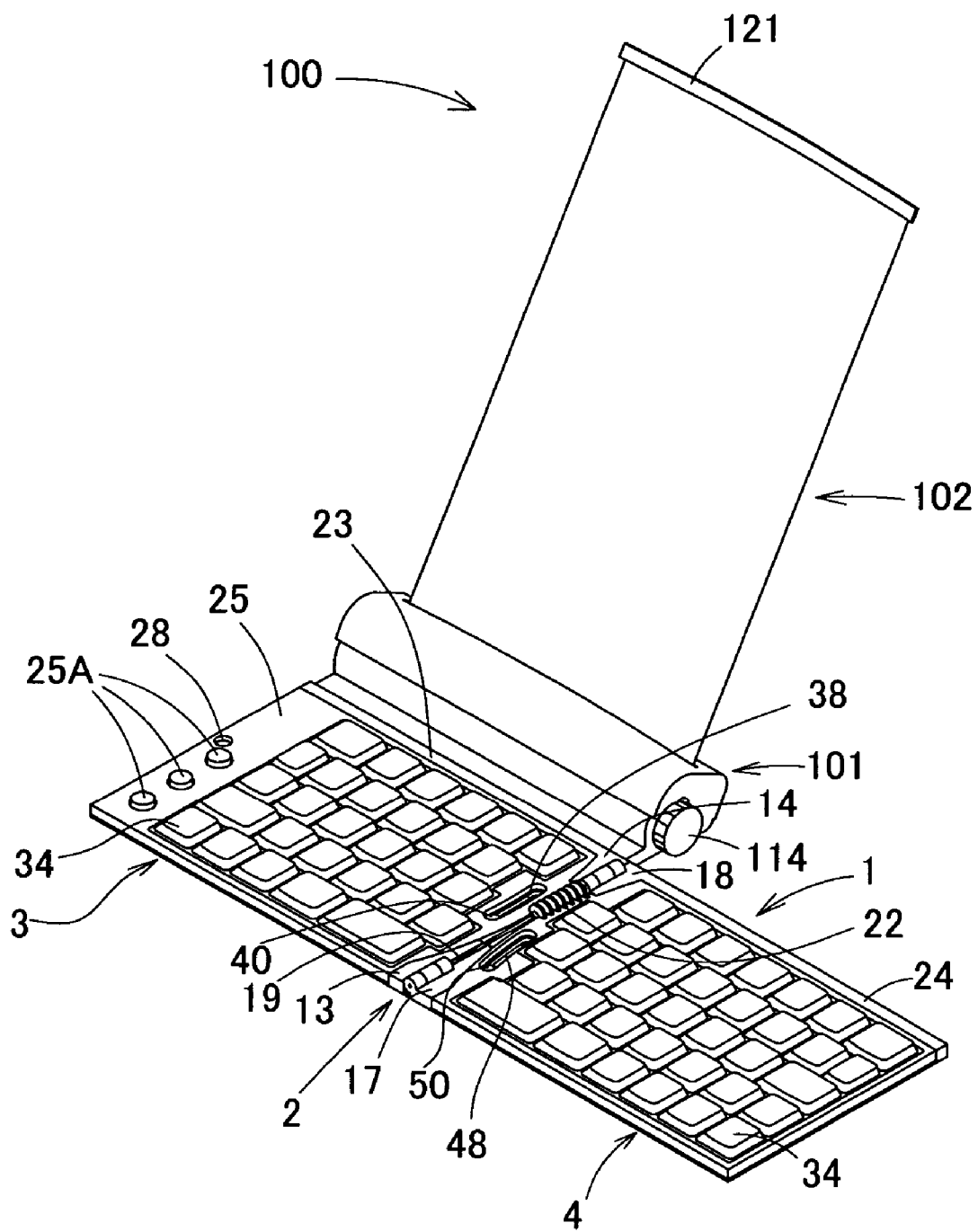
FIG. 1 is a perspective view of an input device in an embodiment.
Figure 2:
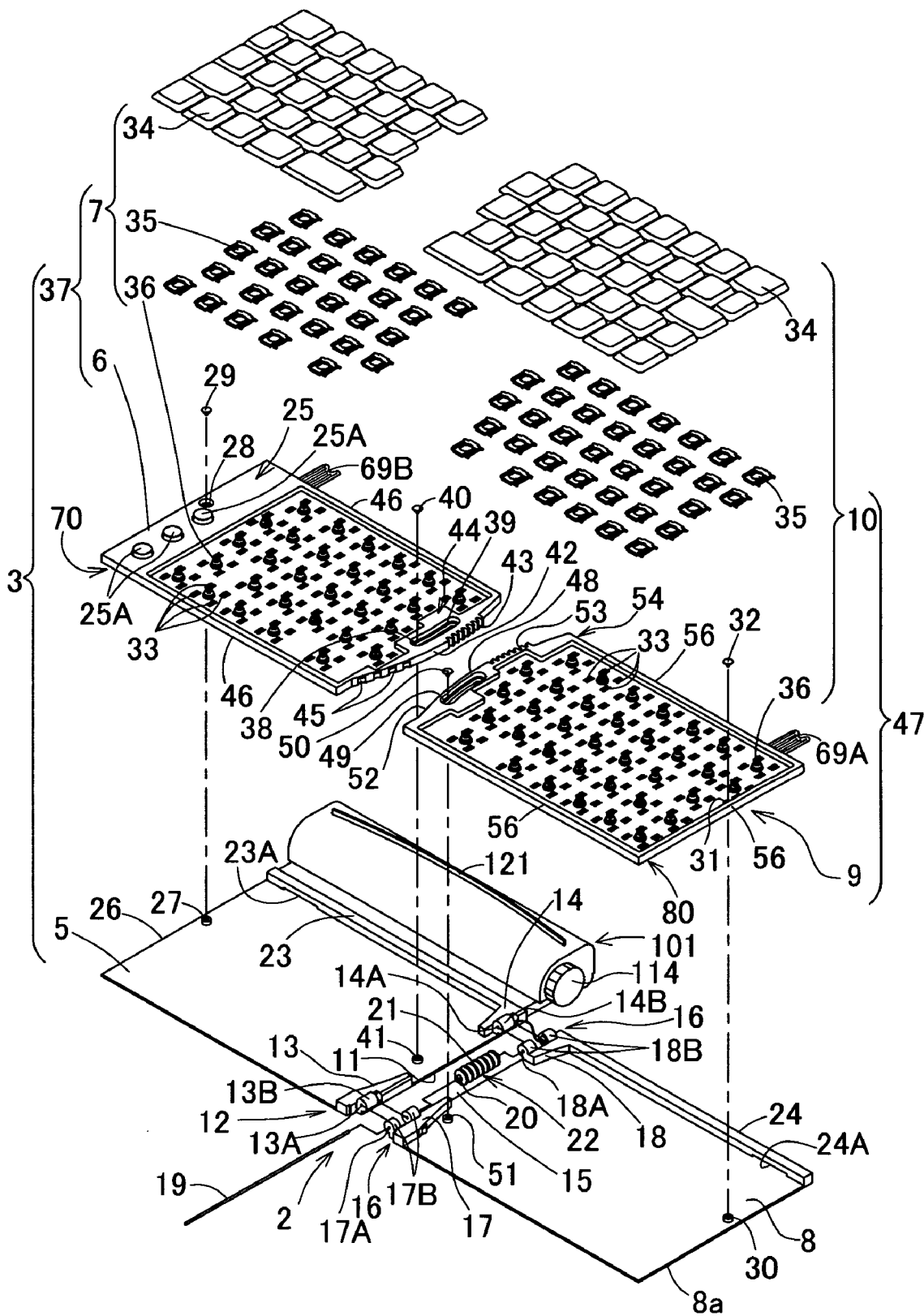
FIG. 2 is an exploded perspective schematic view of the input device.

A detailed description of a preferred embodiment of an input device embodying the present invention will now be given referring to the accompanying drawings. At first, a schematic structure of the input device in an embodiment is explained with reference to FIGS. 1 and 2. FIG. 1 is a perspective view of the input device. FIG. 2 is an exploded perspective view of the same.

In FIG. 1, an input device 100 basically includes a keyboard 1, a housing unit 101 provided at one side (an upper side in FIG. 1) of a first keyboard unit 3 of the keyboard 1 and constructed to house a flexible, windable display 102 in a rolled state during nonuse of the input device 100, and the flexible display 102 for displaying thereon letters or others in a drawn-out (unwound) state from the housing unit 101 during use of the input device 100.

Figure 3:
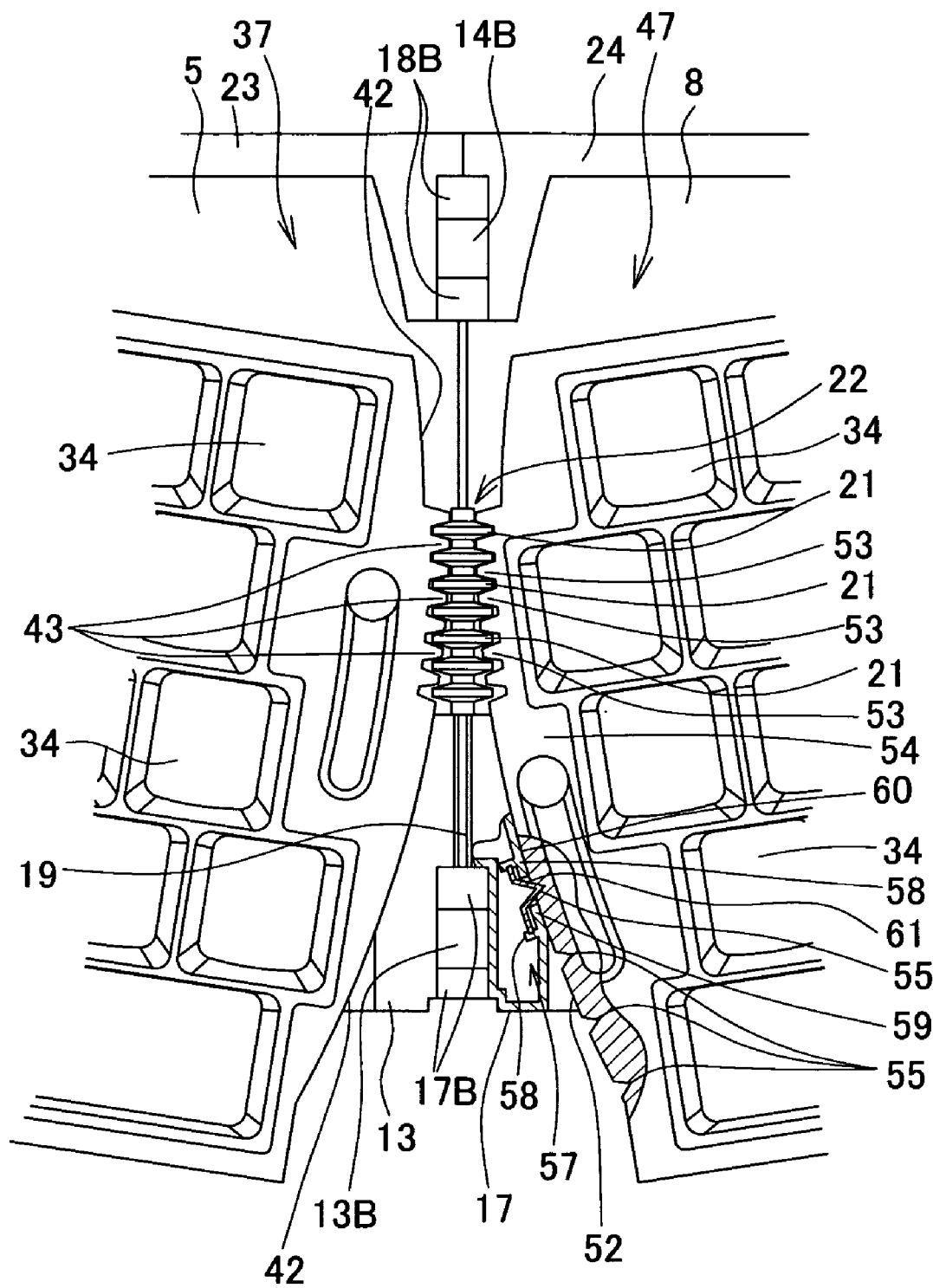
FIG. 3 is an enlarged explanatory view of a synchronizing system for synchronizing turning motions of a first and second support plates.

The keyboard 1 is first explained below in detail with reference to FIGS. 1 through 3. FIG. 3 is an enlarged explanatory view of a synchronizing system for synchronizing turning motions of a first and second support plates. The keyboard 1 basically includes a first and second keyboard units 3 and 4 which are rotatably connected with each other through a rotatable connecting part 2. The first keyboard unit 3 is constructed of a first base plate 5, a first support plate 6 supported to be horizontally turnable on the first base plate 5, and a plurality of key switches 7 arranged on the first support plate 6. The second keyboard unit 4 is constructed of a second base plate 8, a second support plate 9 supported to be horizontally turnable on the second base plate 8, and a plurality of key switches 10 arranged on the second support plate 9.

The connecting part 2 is explained below. The first base plate 5 is made of a metallic thin plate such as aluminum (or which may be made of a resinous thin plate). This plate 5 is provided, at two corners 12 (one of which is shown) of an edge (a right edge in FIG. 1) 11, with resinous bearing members 13 and 14 constituting a part of the connecting part 2. The bearing member 13 is provided with a bearing 13B formed with a bearing hole 13A. The bearing member 14 is similarly provided with a bearing 14B formed with a bearing hole 14A.

The second base plate 8 is made of a metallic thin plate such as aluminum (or which may be made of a resinous thin plate), as with the first base plate 5. This plate 8 is provided, at two corners 16 of an edge (a left edge in FIG. 1) 15, with resinous bearing members 17 and 18 constituting a part of the connecting part 2. The bearing member 17 is provided with two separate bearings 17B each having a bearing hole 17A. Similarly, the bearing member 18 is provided with two separate bearings 18B each having a bearing hole 18A. The bearing 13B is engaged in between the bearings 17B so that the bearing hole 13A of the bearing 13B is aligned with the bearing holes 17A of the bearings 17B. The bearing 14B is engaged in between the bearings 18B so that the bearing hole 14A is aligned with the bearing holes 18A of the bearings 18B. In these aligned bearing holes 13A, 17A, 14A, and 18A, a support shaft 19 is mounted. Thus, the first and second base plates 5 and 8 are rotatably supported through the support shaft 19. On this shaft 19, a slidable member 22 having a cylindrical shape with a center hole 20 and gear teeth 21 concentrically arranged on the periphery is slidably fit through the center hole 20. The slidable member 22 serves to turn the first and second keyboard units 3 and 4 in sync with each other, and the effect thereof will be mentioned later.

It is to be noted that the bearing member 14 is integrally formed with a hollow peripheral wall 23 and the bearing member 18 is integrally formed with a hollow peripheral wall 24. This peripheral wall 24 is formed with a hole 24A through which a sheet-shaped lug 69A is inserted in the wall 24. The lug 69A is provided with signal wires for connecting each key switch 10 arranged on the second keyboard unit 4 to a control part (not shown) placed in the housing unit 101. Specifically, the lug 69A is a sheet sandwiched between and extended from an upper and lower sheets constituting a membrane switch of each key switch 10. This lug 69A forms a lead wire not shown which is guided through the inside of the peripheral wall 24 to the outside via the hollow bearing member 18 and the bearing 18B and then wound on the support shaft 19 and guided into the peripheral wall 23 through the hollow bearing member 14. The peripheral wall 23 is formed with a through hole 23A through which a sheet-shaped lug 69B is inserted in the wall 23. The lug 69B is constituted of signal wires for connecting each key switch 7 provided on the first keyboard unit 3 to the control part. It is to be noted that the lug 69B is a sheet sandwiched between and extended from an upper and lower sheets constituting a membrane switch of each key switch 7. This lug 69B forms a lead wire not shown which is connected to the control part together with the lead wire guided from the second keyboard unit 4 through the peripheral walls 24 and 23.

The first base plate 5 is formed with a screw seat 27 at almost the center of and near an edge 26 opposite to the edge 11. A screw 29 is threaded into this screw seat 27 after passing, with play, through a screw hole (not shown) formed in the first support plate 6 and a screw hole 28 formed in a frame member 70 mentioned later, specifically, in the switch section 25 integrally formed with the frame member 70, in correspondence with the former screw. Thus, the first support plate 6 is mounted on the first base plate 5 so as to be horizontally turnable (pivotable) about the screw 29 and the screw seat 27 as a turning fulcrum (pivot point). The second base plate 8 is formed with a screw seat 30 at almost the center of and slightly inside an edge 8a opposite to the edge 15. A screw 32 is threaded into this screw seat 30 after passing through a screw hole 31 of the second support plate 9 with play. Thus, the second support plate 9 is mounted on the second base plate 8 so as to be horizontally turnable (pivotable) about the screw seat 30 as a turning fulcrum (pivot point).

The first support plate 6 of the first keyboard unit 3 is made of a metallic thin plate such as aluminum, on which a predetermined number of key switches 7 which are operated with the left hand of a user are arranged. It is to be noted that the number of the key switches 7 for the left hand is determined based on International Standards (ISO 2126 and ISO 2530).

Furthermore, the first support plate 6 is integrally formed with four engagement parts 33 for one key switch 7 by press working or other techniques. On this first support plate 6, there is placed a membrane switch of a three-layer structure not shown (including an upper sheet having a movable electrode, a lower sheet having a fixed electrode, and a spacer sheet placed between the upper and lower sheets and having a switching hole whereby to separate the movable electrode and the fixed electrode). Each engagement part 33 is formed protruding upward through holes formed in the membrane switch.

Each key switch 7 is basically structured of a key top 34, a pair of link members 35 for vertically guiding the key top 34, and a rubber spring 36 which is disposed on the membrane switch at a position corresponding to a switching part defined by the movable electrode and the fixed electrode of the membrane switch and urges the key top 34 upward. Each upper end of the link members 35 is movably connected with the key top 34 at its lower surface and each lower end of the link members 35 is movably engaged in each engagement part 33. During non-depression, the key top 34 is urged upward by the urging force of the rubber spring 36 and held in a non-depression position. When the key top 34 is pressed down against the urging force of the rubber spring 36, the rubber spring 36 pushes the movable electrode of the membrane switch to bring the movable electrode into contact with the fixed electrode in the switching hole, thereby performing a switching operation. The above mentioned key switches 7 and first support plate 6 constitute a first key unit 37. The structure of each key switch 7 is well known in the art and the detailed explanation thereof is omitted herein.

The first support plate 6 is formed with a side edge (a right side in FIG. 2) which forms a circularly arcuate face coincident with a turning radius of the plate 6 about the turning fulcrum (i.e., the screw 29 passing through the screw hole 28 with play and the screw seat 27). Inside the circularly arcuate face, an arcuate slot 39 is formed, which receives a screw 40 with play. This screw 40 is threaded into a screw seat 41 formed in the first base plate 5. The slot 39 and the screw 40 act to guide the first support plate 6 for horizontal stable turning thereof on the first base plate 5.

On the first support plate 6, a rectangular frame member 70 integrally made of resin is provided surrounding the peripheral portions of the plate 6. This frame member 70 is provided with a switch section 25 in which various switches 25A are arranged, peripheral walls 46, and a first gear member 44. This first gear member 44 has, on the circularly arcuate face side of the first support plate 6, a circularly arcuate face 42 having the same curvature of radius as that of the circularly arcuate face of the first support plate 6. The circularly arcuate face 42 is formed with gear teeth 43 engageable with the gear teeth 21 of the slidable member 22. Furthermore, the circularly arcuate face 42 of the first gear member 44 is formed with a plurality of locking recesses 45 which constitute a part of a locking system 57 mentioned later. The first gear member 44 is also formed with a slot 38 corresponding to the slot 39 in the first support plate 6.

The second support plate 9 in the second keyboard unit 4 is made of a metallic thin plate such as aluminum, as with the first support plate 6. On the second support plate 9, on which a predetermined number of key switches 10 which are operated with the right hand of a user are arranged. It is to be noted that the number of the key switches 10 for the right hand is determined based on International Standards (ISO 2126 and ISO 2530), which is larger than the number of key switches 7 for the left hand on the first support plate 6. The key switch 10 is of identical construction to that of the key switch 7 mentioned above and therefore the constituent elements are explained with the same reference numbers.

The second support plate 9 is integrally formed with four engagement parts 33 for one key switch 10 by press working or other techniques. On this second support plate 9, there is placed a membrane switch of a three-layer structure not shown (including an upper sheet having a movable electrode, a lower sheet having a fixed electrode, and a spacer sheet placed between the upper and lower sheets and having a switching hole whereby to separate the movable electrode and the fixed electrode). Each engagement part 33 is formed protruding upward through holes formed in the membrane switch.

Each key switch 10 is basically structured of a key top 34, a pair of link members 35 for vertically guiding the key top 34, and a rubber spring 36 which is disposed on the membrane switch at a position corresponding to a switching part defined by the movable electrode and the fixed electrode of the membrane switch, and urges the key top 34 upward. Each upper end of the link members 35 is movably connected with the key top 34 at its lower surface and each lower end of the link members 35 is movably engaged in each engagement part 33. During non-depression, the key top 34 is urged upward by the urging force of the rubber spring 36 and held in a non-depression position. When the key top 34 is pressed down against the urging force of the rubber spring 36, the rubber spring 36 pushes the movable electrode of the membrane switch to bring the movable electrode into contact with the fixed electrode in the switching hole, thereby performing a switching operation. The above mentioned key switch 10 and second support plate 9 constitute a second key unit 47.

The second support plate 9 is formed with a side edge (a left side in FIG. 2) which forms a circularly arcuate face coincident with a turning radius of the plate 9 about the turning fulcrum (the screw 32 passing through the screw hole 31 with play and the screw seat 30). Inside the circularly arcuate face, an arcuate slot 49 is formed, which receives a screw 50 with play. This screw 50 is threaded into a screw seat 51 formed in the second base plate 8. The slot 49 and the screw 50 act to guide the second support plate 9 for horizontal stable turning thereof on the second base plate 8.

On the second support plate 9, a rectangular frame member 80 integrally made of resin is provided surrounding the periphery of the plate 9. This frame member 80 is provided with peripheral walls 56 and a second gear member 54. This second gear member 54 has, on the circularly arcuate face side of the second support plate 9, a circularly arcuate face 52 having the same curvature of radius as that of the circularly arcuate face of the second support plate 9. The circularly arcuate face 52 is formed with gear teeth 53 engageable with the gear teeth 21 of the slidable member 22. Furthermore, the circularly arcuate face 52 of the second gear member 54 is formed with a plurality of locking recesses 55 (see FIG. 3) which constitute a part of a locking system 57 mentioned later. The second gear member 54 is also formed with a slot 48 corresponding to the slot 49 in the second support plate 9.

Figure 4:
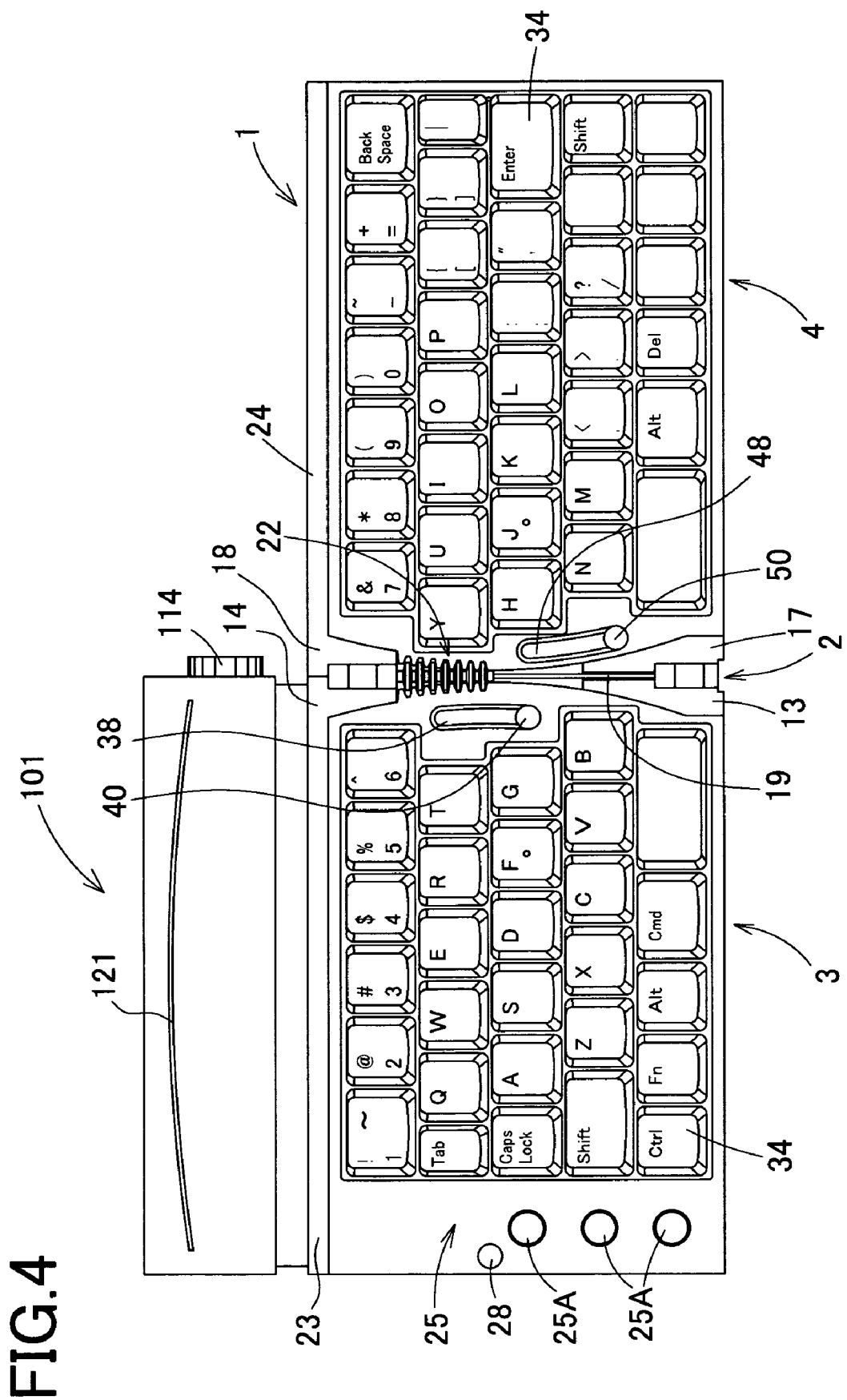
FIG. 4 is an explanatory view of the first and second support plates in respective unturned positions.
Figure 5:
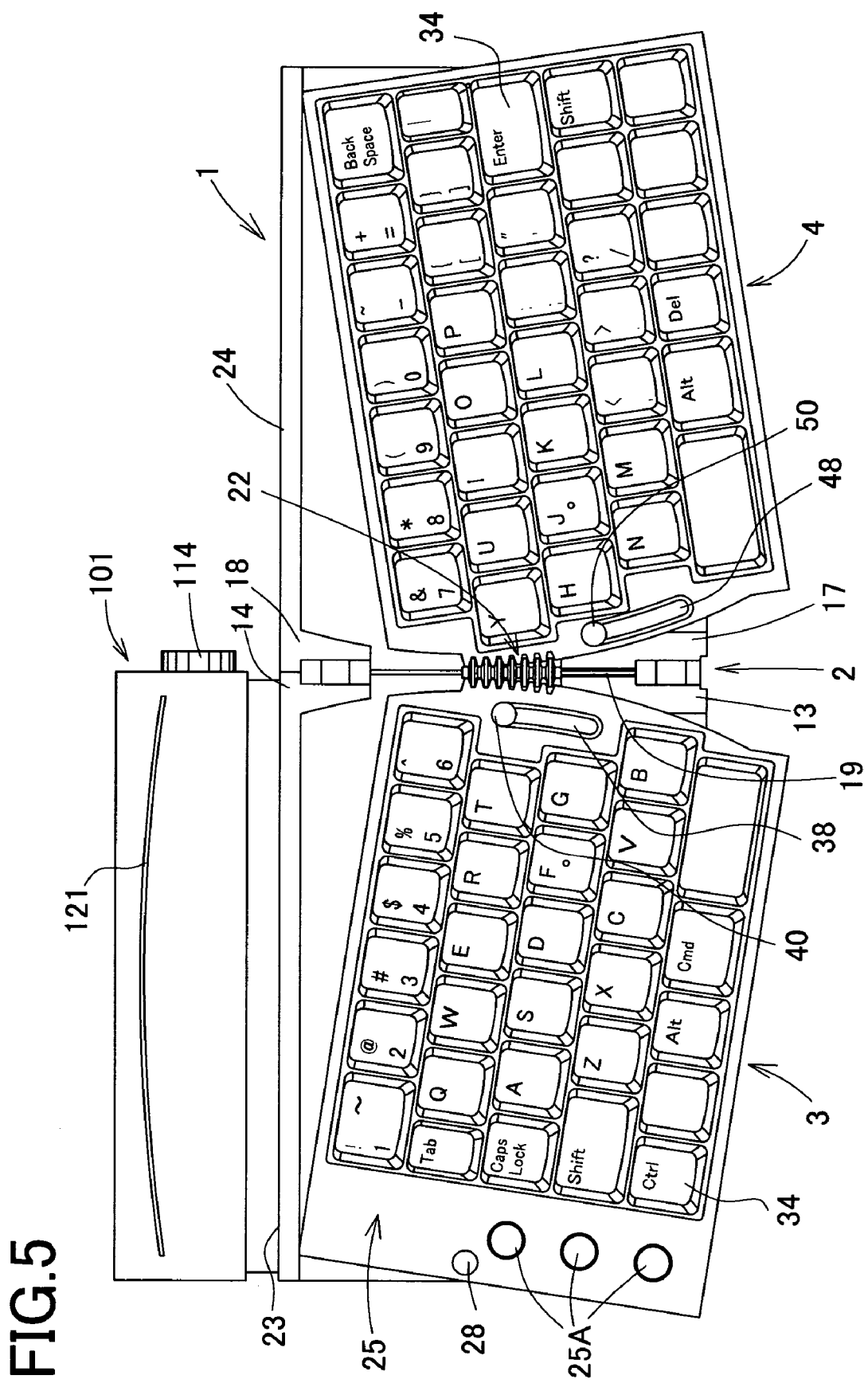
FIG. 5 is an explanatory view of the first and second support plates turned to respective maximum turning positions.

Next, explanation is made on the synchronizing system for horizontally turning the first and second support plates 6 and 9 at the same time on the first and second base plates 5 and 8 respectively and the locking system for locking the first and second support plates 6 and 9 at respective turned positions after turning by means of the synchronizing system, referring to FIGS. 3 through 5. FIG. 3 is an enlarged explanatory view of the synchronizing system for synchronizing turning motions of the first and second support plates 6 and 9. FIG. 4 is an explanatory view of the first and second support plates 6 and 9 in respective unturned positions. FIG. 5 is an explanatory view of the first and second support plates 6 and 9 turned to respective maximum turning positions.

In FIG. 3, the gear teeth 43 formed on the circularly arcuate face 42 of the first gear member 44 and the gear teeth 53 formed on the circularly arcuate face 52 of the second gear member 54 are engaged with the gear teeth 21 of the slidable member 22 slidably fit on the support shaft 19.

The gear teeth 21 of the slidable member 22 are concentrically formed as above, so that the distances (lengths) from the center of the slidable member 22 to the peripheral edges of the gear teeth 21 are equal to one another. The gear teeth 43 and the gear teeth 53 are formed on the circularly arcuate faces 42 and 52 respectively, so that the peripheral edges of the gear teeth 43 and 53 are arranged in a circular arc relation. Accordingly, the gear teeth 21 nonuniformly engage with the gear teeth 43 and 53, specifically, shallow in a part and deep in another part. Such engagement relation does not change even when the slidable member 22 is slid on the support shaft 19 in association with the turning of the first and second support plates 6 and 9. However, the gear teeth 21 of the slidable member 22 always partly deep engage with the gear teeth 43 of the first gear member 44 and the gear teeth 53 of the second gear member 54 wherever the slidable member 22 is on the support shaft 19, thereby keeping the engagement between gear teeth 21 and each of the gear teeth 43 and 53.

In an unturned, original state of the first and second support plates 6 and 9 as shown in FIG. 4, the key switches 7 and 10 are arranged on the support plates 6 and 9 in the same key arrangement as that in a standard keyboard. In this state, the engagement between the gear teeth 21 of the slidable member 22 and the gear teeth 43 of the first gear member 44 and the gear teeth 53 of the second gear member 54 respectively is shallow in an upper portion in FIG. 4 and deep in a lower portion. Naturally, the keyboard 1 can be operated in the above key arrangement as needed.

It is to be noted that the distance from the engaging position between the gear teeth 43 of the first support plate 6 and the gear teeth 21 of the slidable member 22 to the screw 29 (the turning center) and the distance from the engaging position between the gear teeth 53 of the second support plate 9 and the gear teeth 21 of the slidable member 22 to the screw 32 (the turning center) are determined to be equal to each other. Thus, the slidable member 22 serves to smoothly turn the support plates 6 and 9.

When the first key unit 37 or the second key unit 47 in the position shown in FIG. 4 is turned clockwise or counterclockwise in FIG. 4, the slidable member 22 of which the gear teeth 21 engage with the gear teeth 43 and 53 of the first and second gear members 44 and 54 is caused to slide downward in FIG. 4 on the support shaft 19. This synchronously causes the first support plate 6 to turn clockwise about the screw 29 and the screw seat 27 as the turning fulcrum and the second support plate 9 to turn counterclockwise about the screw 32 and the screw seat 30 as the fulcrum. The keyboard 1 can also be operated in this key arrangement.

When the first support plate 6 or the second support plate 9 is further turned, the slidable member 22 is caused to slide further downward on the support shaft 19 in the same way as the above case. The first and second support plates 6 and 9 are synchronously turned clockwise and counterclockwise respectively up to the maximum turning positions as shown in FIG. 5. The keyboard 1 can also be operated in this key arrangement.

Accordingly, when a user turns either the first key unit 37 or the second key unit 47 prior to the operation of the keyboard 1, the other key unit is allowed to turn in synchronization with the unit turned by the user. Such a very simple operation makes it possible to arrange the key units 37 and 47 in a desired operating position so that the user can operate the keyboard in the most favorable operating configuration.

Next, the locking system is explained below with reference to FIG. 3 for locking the first and second key units 37 and 47 to the first and second base plates 5 and 8 respectively after the key units 37 and 47 are synchronously turned to the desired positions.

The locking systems 57 are provided between the first base plate 5 and the first key unit 37 and between the second base plate 8 and the second key unit 47 respectively. Since these locking systems 57 are of identical structures, the following explanation is made on only the locking system 57 provided between the second base plate 8 and the second key unit 47. It is to be noted that the locking system 57 between the first base plate 5 and the first key unit 37 is constructed of locking recesses 45 formed on the circularly arcuate face 42 of the first gear member 44 disposed in the first support plate 6 of the first key unit 37 and a resilient locking piece (not shown) formed in the bearing member 13 at the corner 12 of the first base plate 5.

Here, the locking system 57 is provided in each of the first key unit 37 and the second key unit 47, but may be provided in only one of them.

In the locking system 57 shown in FIG. 3, the bearing member 17 formed at the corner 16 of the second base plate 8 is of a hollow shape in which a pair of holding portions 58 are formed. A resilient locking piece 59 made of a resilient metallic thin plate shaped like a Japanese syllabary character "<" (like an L-shape) is supported at both ends between the pair of holding portions 58. A concave curved face 60 of the bearing member 17 in contact with the circularly arcuate face 52 of the second gear member 54 is formed with a hole 61 through which the apex of the locking piece 59 protrudes outwards. The apex of the locking piece 59 protruding through the hole 61 is engaged in one of a plurality of locking recesses 55 formed on the circularly arcuate face 52 of the second gear member 54.

When the first and second key units 37 and 47 are synchronously turned to desired positions, the apex of the locking piece 59 of the locking system 57 is engaged in the locking recess 55 of the second gear member 54 at that position, thereby locking the first and second key units 37 and 47 there. Accordingly, the keyboard can be operated stably in a fixed state favorable for individual users.

The locking system 57 is simply constructed of the locking recesses 55 formed on the circularly arcuate face 52 of the second gear member 54 and the resilient locking piece 59 disposed in the bearing member 17 in the second base plate 8. Thus, each locking system 57 for the first and second key units 37 and 47 can be realized at a low cost. The locking recesses 55 being formed on the circularly arcuate face 52 of the second gear member 54 can be made concurrently with the formation of the gear teeth 53. This makes it possible to further reduce the cost.

Figure 6:
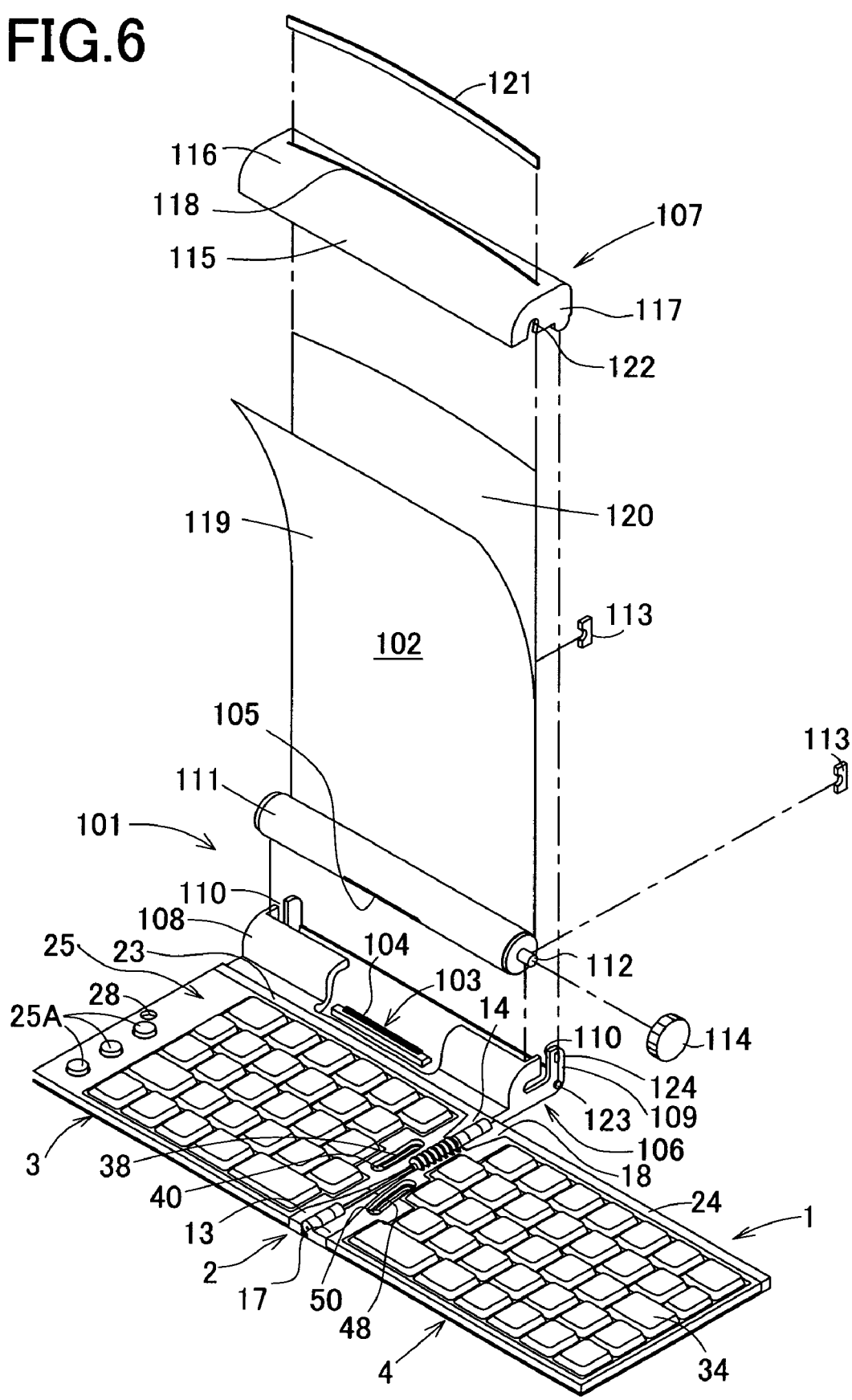
FIG. 6 is an exploded perspective view of a housing unit attached to a keyboard.

The following explanation is made on the housing unit 101 with reference to FIG. 6. FIG. 6 is an exploded perspective view of the housing unit 101 attached to the keyboard 1. Specifically, the housing unit 101 is attached to the first keyboard unit 3 at one side thereof, along a direction perpendicular to the support shaft 19 in the connecting part 2. This housing unit 101 holds therein a control part not shown to which a lead wire extended from the lug 69A guided from the second keyboard unit 4 through the peripheral walls 24 and 23 and a lead wire extended from the lug 69B in the first keyboard unit 3 are in combination connected. Furthermore, the control part is connected with a connector 103 through a flexible substrate (not shown). The connector 103 is disposed in the housing unit 101 close to the keyboard unit 3 and has a contact terminal 104 which is electrically connected with a contact terminal 105 of the flexible display 102. The control part in the housing unit 101 thus controls the keyboard 1 and the flexible display 102.

Figure 7:
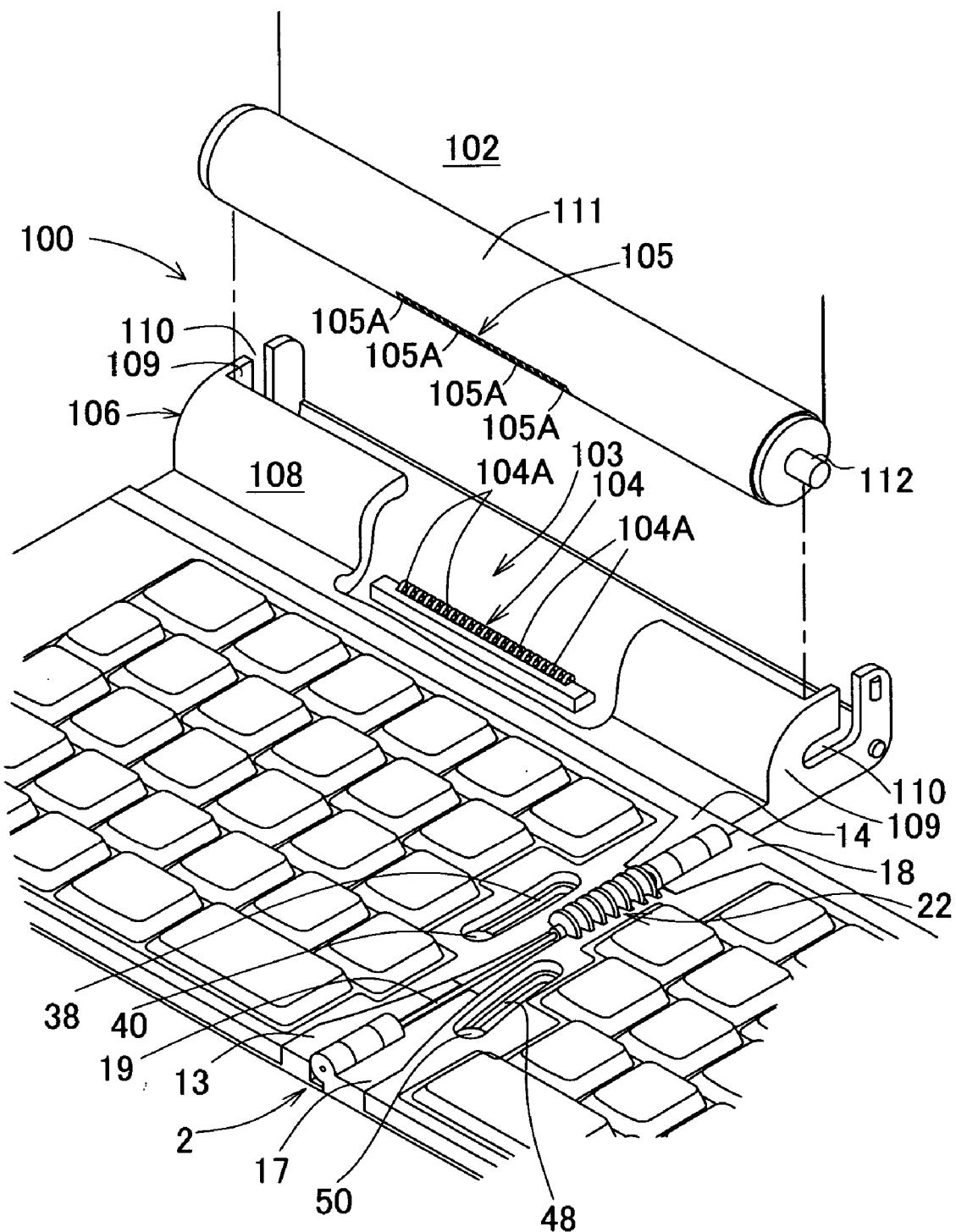
FIG. 7 is an enlarged explanatory view of a connecting structure between a contact terminal of a connector and a contact terminal of a flexible display.

A connecting structure between the contact terminal 104 of the connector 103 and the contact terminal 105 of the flexible display 102 is explained below with reference to FIG. 7. FIG. 7 is an enlarged explanatory view of the connecting structure between the contact terminals of the connector and the flexible display.

In FIG. 7, the contact terminal 104 of the connector 103 includes a plurality of terminal electrodes 104A constructed of a bent resilient metallic plate having electrical conducting properties. Each terminal electrode 104A is constructed to be flexibly deformable. The flexible display 102 is wound on a roller 111 serving as a winding element, mentioned later. The contact terminal 105, which is formed on the surface of the roller 111, includes a plurality of terminal electrodes 105A arranged in correspondence with the terminal electrodes 104A of the contact terminal 104. The number of the terminal electrodes 105A is equal to that of the terminal electrodes 104A.

In the flexible display 102, the position of each terminal electrode 105A is determined so that each terminal electrode 105A faces in contact with each corresponding terminal electrode 104A of the contact terminal 104 of the connector 103 when the flexible display 102 is fully drawn out (unwound) from the roller 111. This is based on the following reasons. Specifically, during nonuse of the input device 100, the flexible display 102 is wound on the roller 111 and therefore there is no need to connect the contact terminal 104 of the connector 103 and the contact terminal 105 of the flexible display 102 with each other. Those contact terminals 104 and 105 have to be connected only during use of the input device 100 in which the flexible display 102 is fully drawn out (unwound). Since the roller 111 is rotated for winding in or unwinding the flexible display 102, furthermore, a complicated structure is needed if the contact terminals 104 and 105 are held in continuous connection through a flexible circuit substrate or the like, which makes it difficult to maintain high reliability of the connection.

As shown in FIG. 6, the housing unit 101 is constructed of separate covers; namely, a lower cover 106 disposed at one side of the first keyboard unit 3 and an upper cover 107 disposed covering the lower cover 106 from above. The lower cover 106 includes a front wall 108 shaped in a curve and side walls 109 integrally formed at both ends of the front wall 108. Each side wall 109 is formed with a support groove 110 of an L-shape in side view, consisted of a vertical groove and a horizontal groove.

The above structured lower cover 106 houses the cylindrical roller 111 for winding the flexible display 102 into a rolled state. The roller 111 is formed, at both ends, with support shafts 112 which are supported in the support grooves 110 so as to be movable from the vertical groove to the horizontal groove or reversely. The roller 111 is also rotatably supported by bearing members 113 disposed on the respective side walls 109 of the lower cover 106. A rotating knob 114 is fixed to one of the support shafts 112 (right one in FIG. 6). The roller 111 is thus rotated by operation of the rotating knob 114 from outside of the lower cover 106.

One end (lower end in FIG. 6) of the flexible display 102 is fixed to the periphery of the roller 111, so that the flexible display 102 is wound on the roller 111 into a rolled state by clockwise rotation of the roller 111 and unwound upward from the rolled state by counterclockwise rotation of the roller 111.

The upper cover 107, which is disposed to cover the lower cover 106 from above, is integrally constructed of a front wall 115 having the curvature equal to that of the front wall 108 of the lower cover 106, an upper wall 116 formed continuously upward from the front wall 115, and side walls 117 formed at both ends of the front and upper walls 115 and 116. The upper wall 116 is provided with a slot 118 which is a curved elongate hole having a predetermined large curvature (in top view). The other end, or the upper end, of the flexible display 102 is put through this slot 118. It is to be noted that the flexible display 102 is constructed of a color organic electroluminescence (EL) display sheet 119 and a resilient metallic thin plate 120 laminated to the lower surface (rear surface) of the sheet 119. The upper end of the flexible display 102, which is put through the slot 118 and drawn upward when required, is fixed with a stopper element 121 which is wider (longer) than the slot 118 in its longitudinal direction. This stopper element 121 is used as a draw element to be held or grasped by fingers to draw out the flexible display 102 from the roller 111 placed in the housing unit 101 to the outside of the housing unit 101. On the other hand, the stopper element 121 engages with the slot 118 when the rotating knob 114 is rotated to retract (wind) the flexible display 102 into the housing unit 101. Thus, the stopper element 121 serves as a stopper for preventing the upper end of the flexible display 102 from falling in the housing unit 101 under the slot 108.

The side walls 117 of the upper cover 107 are formed with support grooves 122 (only one is shown) each having a lower open end. The support grooves 122 act in cooperation with the horizontal grooves of the support grooves 110 in the side walls 109 of the lower cover 106 to rotatably support the support shafts 112 of the roller 111.

The thus structured upper cover 107 is supported rotatably back and forth with respect to the lower cover 106. This rotatably supporting structure of the upper cover 107 with respect to the lower cover 106 is explained below with reference to FIGS. 6 and 8A–8D. FIGS. 8A–8D are explanatory views schematically showing the structure of rotatably supporting the upper cover 107 with respect to the lower cover 106.

Figure 8A:
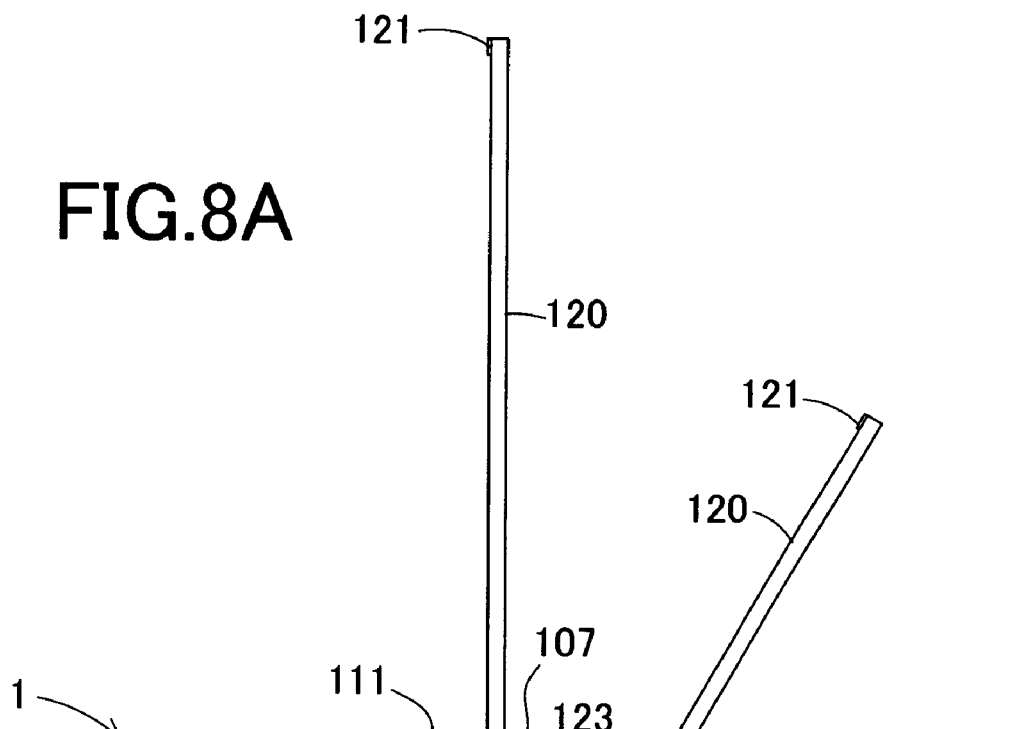
FIGS. 8A through 8D are explanatory views schematically showing a structure of rotatably supporting an upper cover of the housing unit with respect to a lower cover.
Figure 8B:
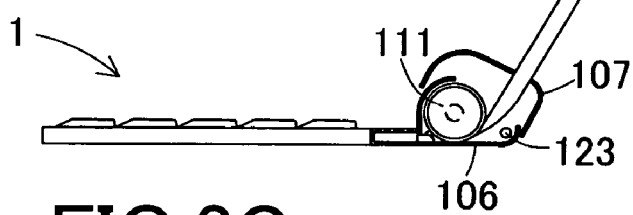
Figure 8C:
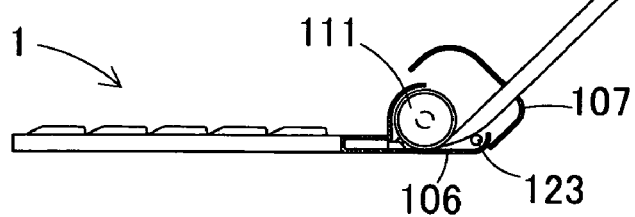
Figure 8D:
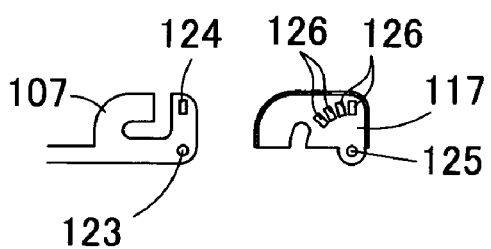

In FIGS. 6 and 8D, each side wall 109 of the lower cover 106 is integrally formed with a support projection 123 serving as a pivot shaft positioned alongside of the vertical groove of the support groove 110 and a locking projection 124 above the support projection 123. It is to be noted that the support and locking projections 123 and 124 are provided in both side walls 109 but one each of them are shown in the drawings. The support projection 123 is received in a hole 125 formed in an inner side surface of each side wall 117 of the upper cover 107. The upper cover 107 is thus rotatably supported with respect to the lower cover 106 by means of the supporting structure constructed of the support projection 123 and the hole 125. Each side wall 117 of the upper cover 107 is further formed, in the inner side surface, with four recesses 126 in which the locking projection 124 is engaged when the upper cover 107 is rotated at corresponding angles. Thus, the upper cover 107 is locked at four-stage rotational positions. The flexible display 102 drawn upward through the slot 118 is also tilted in association with the rotation of the upper cover 107, so that the flexible display 102 can be supported in multiple-stage tilted positions as shown in FIGS. 8A–8C. Consequently, the flexible display 102 can be set in the most favorable tilted position for a user who operates the input device 100 while viewing the flexible display 102. FIG. 8A shows a side view of the flexible display 102 supported at an angle of about 90° with respect to the keyboard 1; FIG. 8B shows the same held at a tilting angle of 120° with respect to the keyboard 1; and FIG. 8C shows the same held at a tilting angle of 135° with respect to the keyboard 1.

Next, the flexible display 102 is explained with reference to FIG. 6. The flexible display 102, as shown in an exploded view in FIG. 6, is mainly constructed of a color organic electroluminescence (EL) display sheet 119 made of an organic EL device formed on a flexible plastic base film. On the rear side of the color organic EL display sheet 119, there is laminated the resilient metallic thin plate 120 having plate spring characteristics, made of for example stainless steel. The flexible display 102 constructed of the color organic EL display sheet 119 and the resilient metallic thin plate 120 is fixed, at one end (lower end), to the periphery of the roller 111. The flexible display 102 is thus wound on the roller 111 based on the flexibility of both the display sheet 119 and the metallic thin plate 120. The other end (upper end) of the flexible display 102, put outside through the slot 118 of the upper cover 107, is fixedly attached with the stopper element 121 as described above.

The resilient metallic thin plate 120 is constructed to provide a curved surface of a large curvature equal to the predetermined curvature of the slot 118 of the upper cover 107. Since the flexible display 102 incorporates such resilient metallic thin plate 120 laminated to the rear side of the color organic EL display sheet 119 and constructed in a curve having the curvature equal to that of the slot 118, the flexible display 102 drawn upward through the slot 118 is supported by the curved resilient metallic thin plate 120 and therefore can be held by itself in vertical condition while maintaining a substantially flat surface. Accordingly, the flatness of the flexible display 102 can be retained without disposing any complicated retainers such as a frame around the flexible display 102, which achieves the input device 100 with a simplified structure and a reduced cost.

Figure 9:
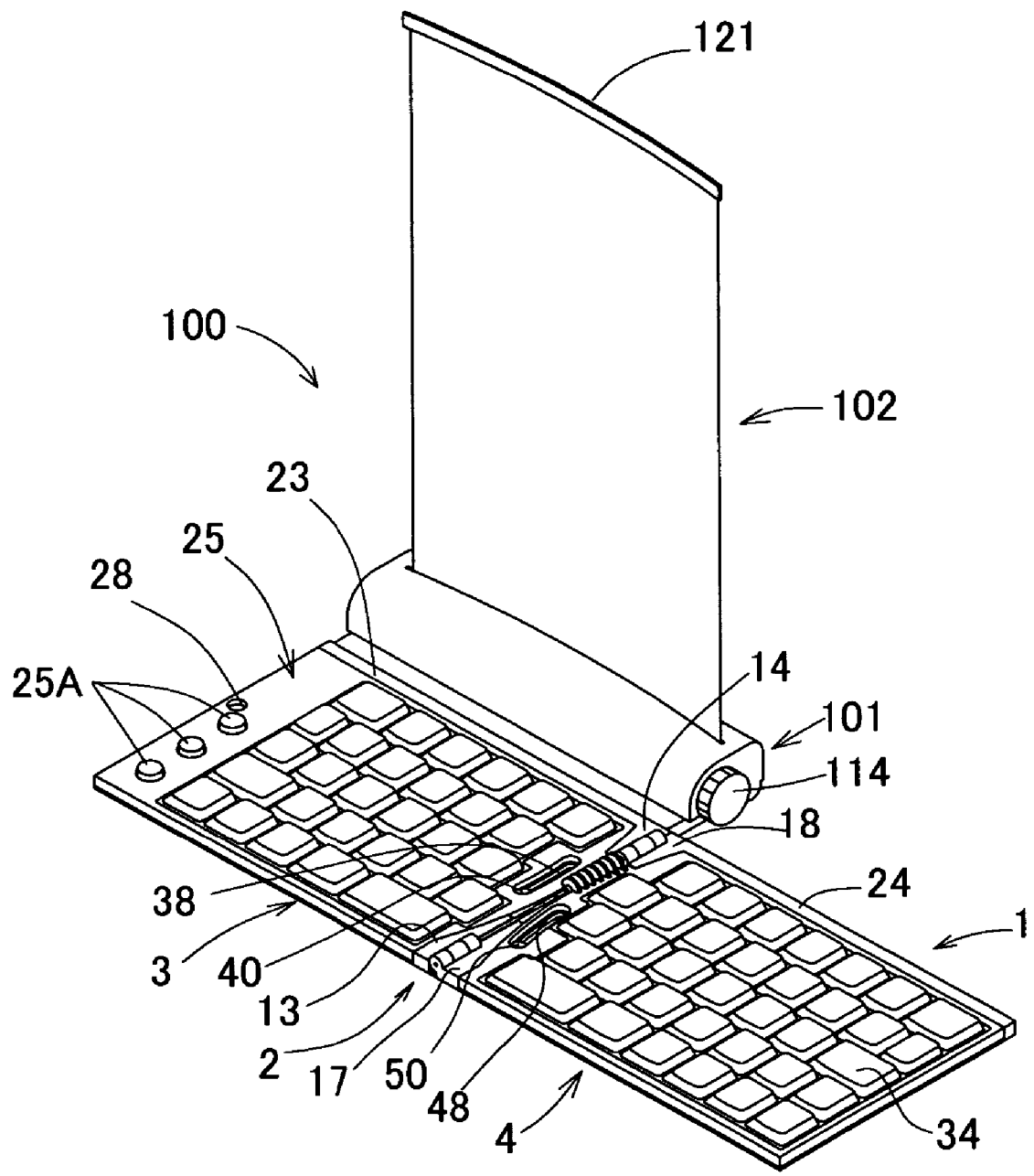
FIG. 9 is an explanatory view showing the input device in an operational state in which the keyboard is in a horizontally opened state and the flexible display is in a drawn-out state.
Figure 10:
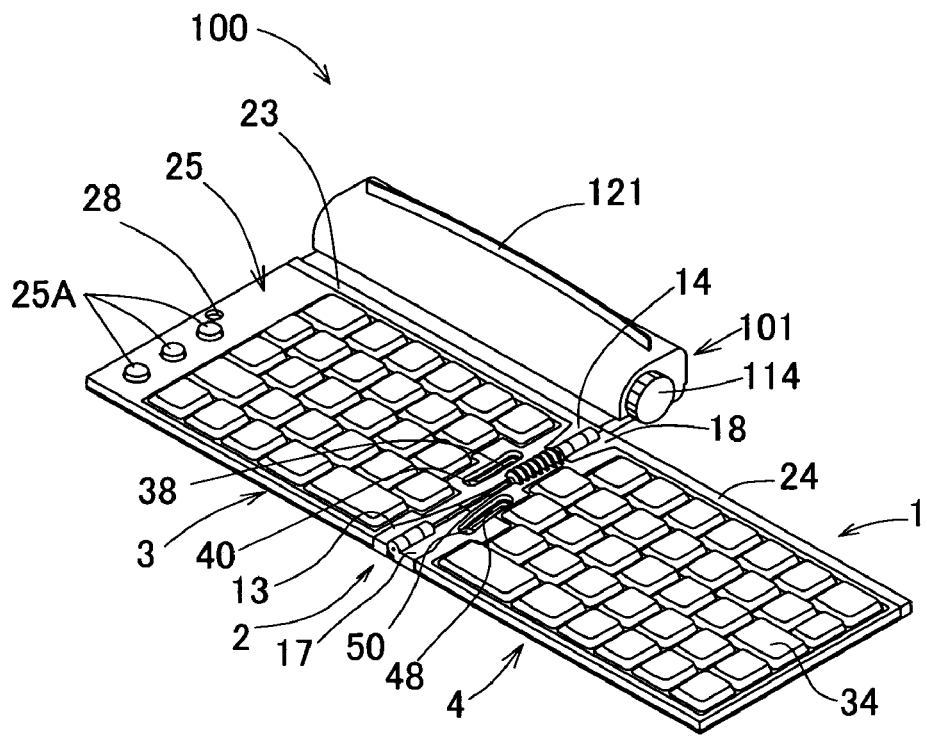
FIG. 10 is an explanatory view showing the input device in which the flexible display is in a wound and housed state in the housing unit.
Figure 11:
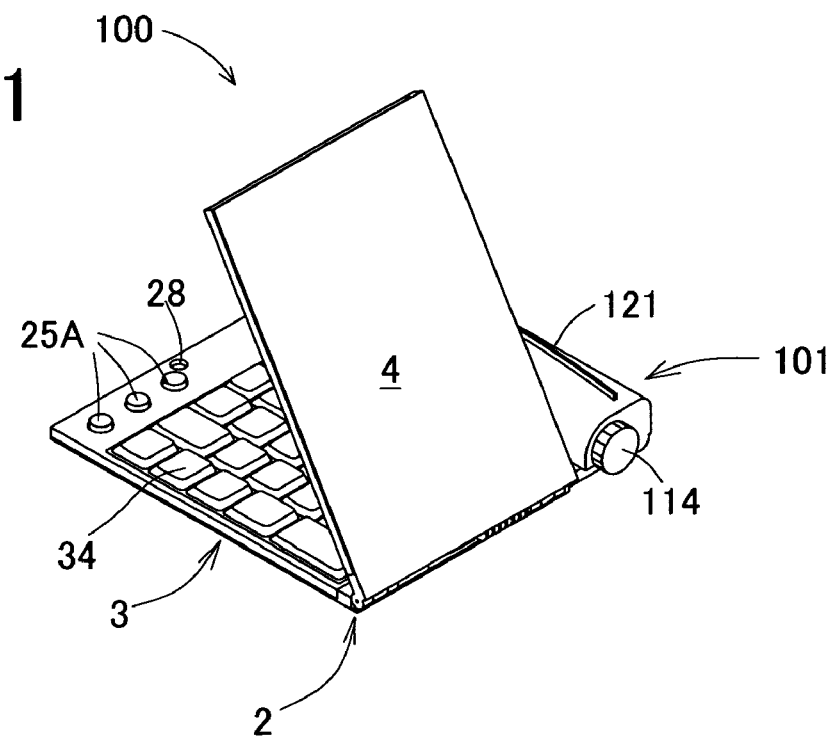
FIG. 11 is an explanatory view showing the keyboard in the process of folding.
Figure 12:
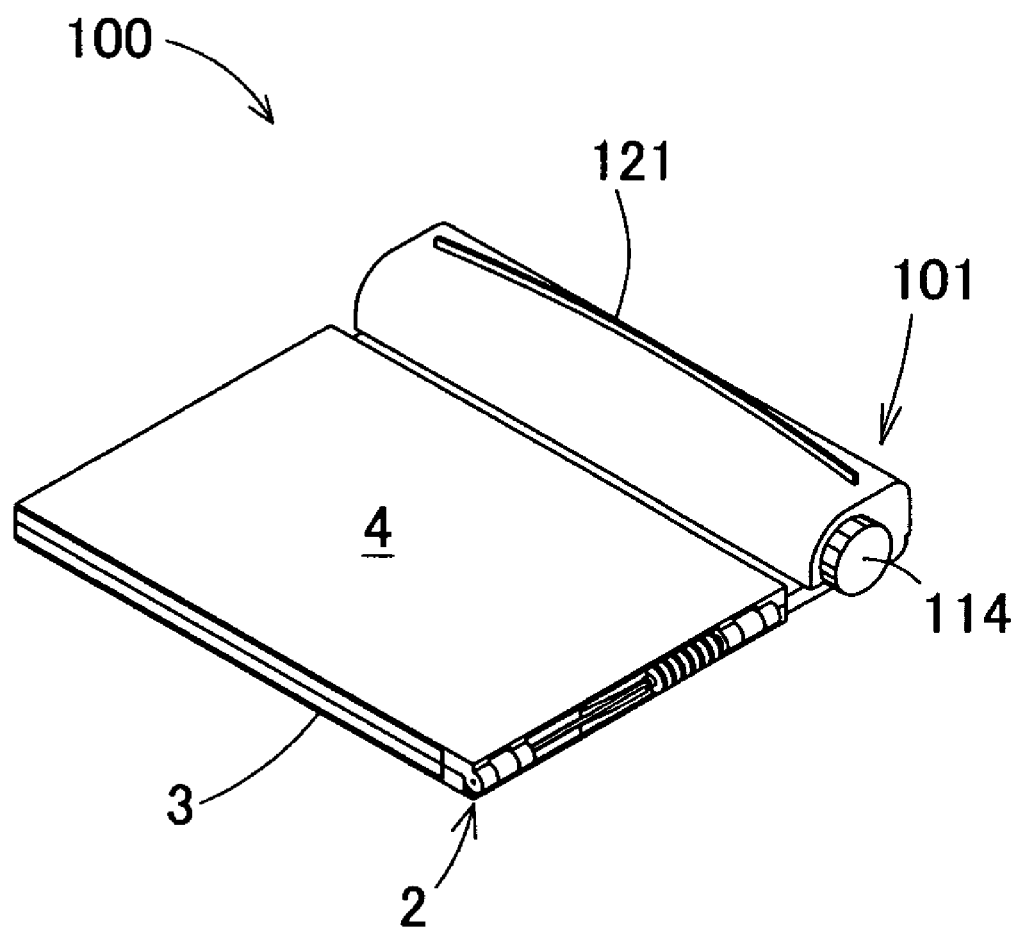
FIG. 12 is an explanatory view showing the keyboard in a completely folded state.

Referring to FIGS. 9 through 12, the folding operation of the keyboard 1 and the retracting operation of the flexible display 102 into the housing unit 101 in the input device 100 constructed as above are explained. FIG. 9 is an explanatory view showing the input device 100 in an operational state in which the keyboard 1 has been rotated into a horizontally open state and the flexible display 102 has been unwound; FIG. 10 is an explanatory view showing the input device 100 in which the flexible display 102 in a wound and housed state in the housing unit; FIG. 11 is an explanatory view showing the keyboard 1 being in the process of folding; and FIG. 12 is an explanatory view showing the keyboard 1 in a completely folded state.

At first, during use of the input device 100, the first and second keyboard units 3 and 4 constituting the keyboard 1 are held in a horizontally arranged state after rotation about the rotatable connecting part 2 in a direction to separate from each other. Thus, the first and second keyboard units 3 and 4 provide an operating area equal to that of the desktop type keyboard, enhancing the key operationality of the input device 100.

At this time, the flexible display 102 has fully been drawn upward from the housing unit 101 through the slot 118 of the upper cover 107. The flexible display 102 in this state is supported by force of the resilient metallic thin plate 120 having a large curvature, laminated to the rear side of the color organic display sheet 119, so that the flexible display 102 can be held by itself in vertical condition. In this state where the flexible display 102 has fully been drawn out, each terminal electrode 105A of the contact terminal 105 is connected, in facing and contact relation, with each terminal electrode 104A of the contact terminal 104 of the connector 103. The control part in the housing unit 101 is thus connected with the first and second keyboard units 3 and 4, while it is connected with the color organic EL display sheet 119 of the flexible display 102 through the contact terminals 104 and 105. This structure allows various kinds of information input with the keyboard 1 to be displayed on the color organic EL display sheet 119 under the control of the control part.

After completion of use of the input device 100, the rotating knob 114 is rotated clockwise in FIG. 9. The flexible display 102 is then progressively wound on the roller 111 while being retracted into the housing unit 101 through the slot 118 of the upper cover 107. It is to be noted that the electrical connection between each terminal electrode 105A of the contact terminal 105 and the each terminal electrode 104A of the contact terminal 104 is released immediately after the start of winding the flexible display 102 onto the roller 111 by clockwise rotation of the rotating knob 114. In association with this release, supply of electrical power from the control part in the housing unit 101 to the flexible display 102 is cut off. Accordingly, the supply of electrical power to the flexible display 102 is stopped at the time when the rotating knob 114 is slightly rotated, so that superfluous electricity consumption can be prevented.

Further clockwise rotation of the rotating knob 114 causes the flexible display 102 to be wound onto the roller 111 so that the display 102 except for the upper end thereof is fully retracted in the housing unit 101. Specifically, the upper end of the display 102 is attached with the stopper element 121 having a larger width (length) than that of the slot 118, as mentioned above, and therefore the stopper element 121 finally comes into contact with the upper surface of the slot 118 as shown in FIG. 10, thereby preventing the upper end of the flexible display 102 from falling in the housing unit 101. The retracting operation of the flexible display 102 into the housing unit 101 is thus finished. This state is shown in FIG. 10.

Subsequently, the folding operation of the keyboard 1 is performed. To fold the keyboard 1, the second keyboard unit 4 is rotated leftwards about the connecting part 2, from the state in FIG. 10 to the state in FIG. 11. When further rotated leftwards, the second keyboard unit 4 is superposed on the first keyboard unit 3. This state is shown in FIG. 12.

To open and set the input device 100 from the nonuse state shown in FIG. 12 to the operational state shown in FIG. 9, the above operations have only to be simply reversed.

In the input device 100 in the present embodiment explained above, the contact terminal 105 of the flexible display 102 is connected with the contact terminal 104 of the connector 103 electrically connected with the first and second keyboard units 3 and 4 after the flexible display 102 is fully drawn out from the housing unit 101 through the slot 118. This establishes connection of the flexible display 102 and the keyboard 1 through the control part in the housing unit 101 only when needed for use of the input device 100. The flexible display 102 is constructed to be windable so as to be housed in a rolled state in the housing unit 101; therefore, loose connection which would often be caused if the keyboard 1 and the flexible display 102 are held in continuous connection can be prevented from occurring. Thus, high reliability of electrical connection between the flexible display 2 and the keyboard 1 can be maintained.

Furthermore, the resilient metallic thin plate 120 laminated to the rear side of the color organic EL display sheet 119, constituting the flexible display 102, is configured in a curve of the curvature equal to the predetermined curvature of the slot 118 of the housing unit 101. The flexible display 102 drawn upward through the slot 118 is thus supported by the curved plate 120 so that the flexible display 102 can be held by itself in vertical condition while maintaining a substantially flat surface having a large curvature. To retain the flatness of the flexible display 102, there is no need of disposing complicated holding members such as a frame or the like around the flexible display 102. Consequently, the input device 100 with a simplified structure and a reduced size can be achieved.

Figure 13:
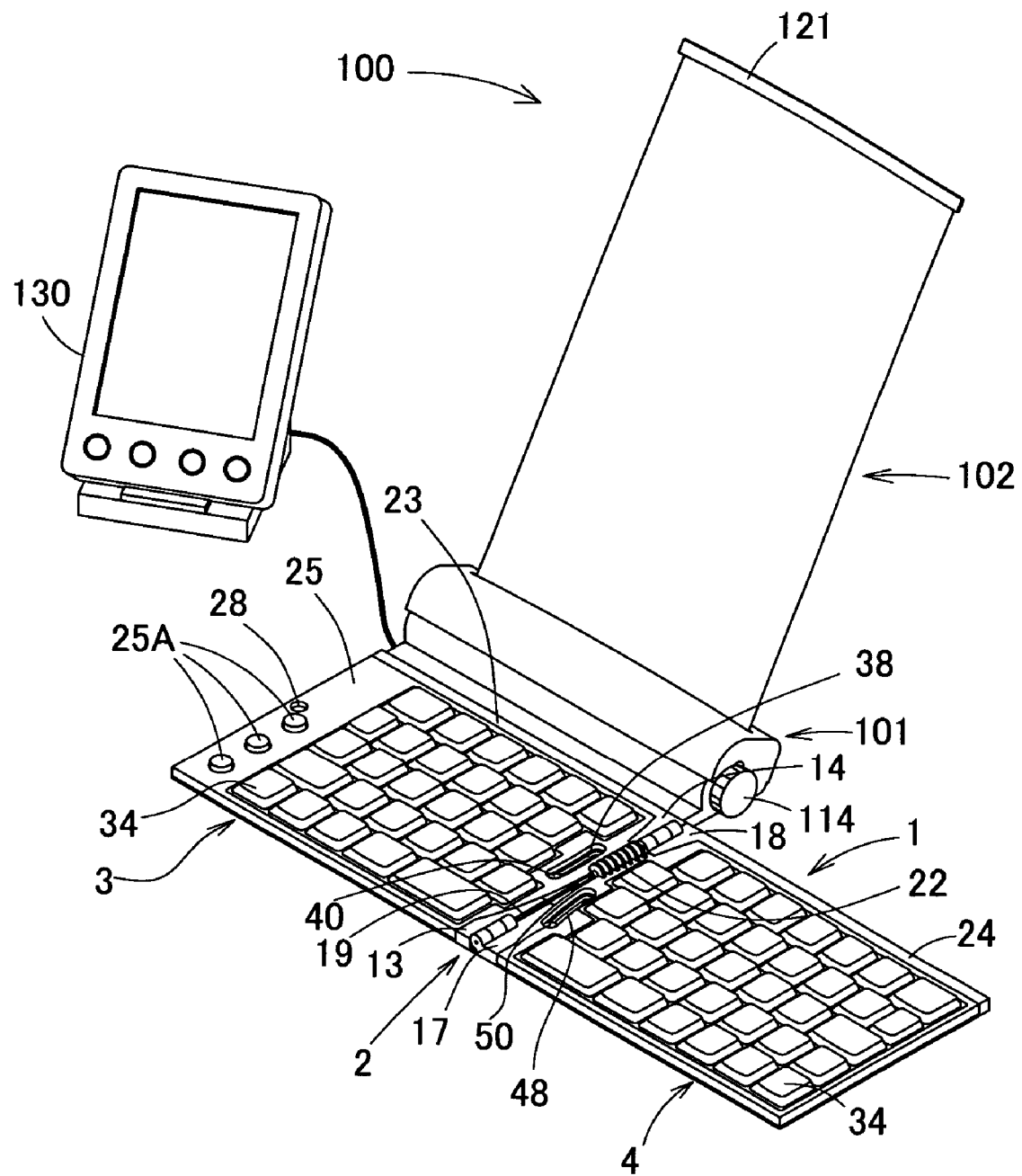
FIG. 13 is a perspective view of the input device connected to a PDA.
Figure 14:
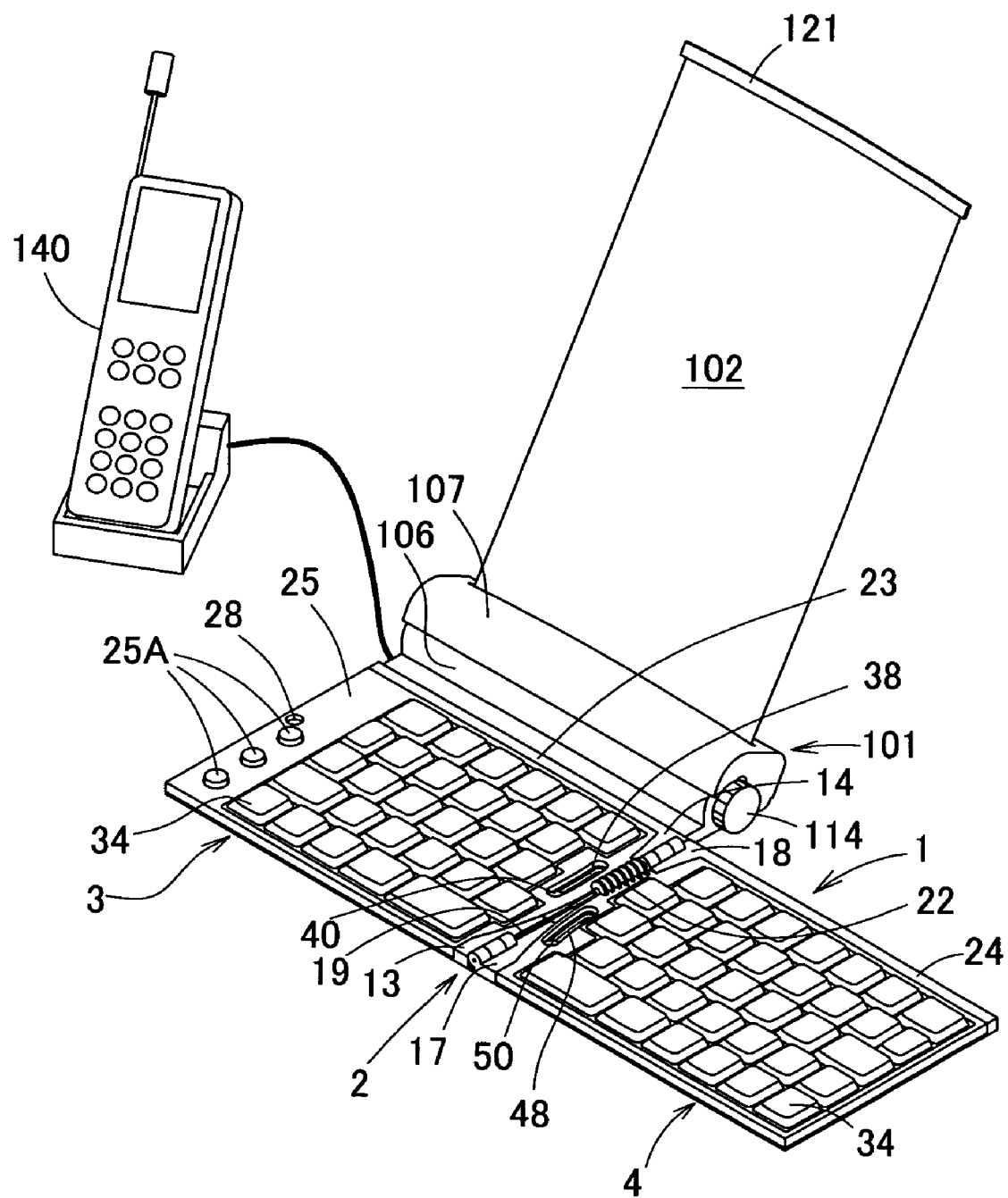
FIG. 14 is a perspective view of the input device connected to a cell phone.

Operational patterns of the input device 100 constructed as above include the following examples. As shown in FIG. 13, for example, a personal digital assistance (PDA) 130 is connected to the housing unit 101 so that the input device 100 is used as a data input device for the PDA 130. As shown in FIG. 14, a cell phone 140 is connected to the housing unit 101 so that the input device 100 is used as a data input device for the cell phone 140. In these operational patterns, the input device 100 can solve inconveniences of the PDA 130 and the cell phone 140 which have data input keys so small in number and size as to make data input difficult and troublesome and have so small displays as to make displayed data hard to see. The device 100 can be utilized with the data input ability and data display ability equivalent to those of the desktop type device.

Figure 15:
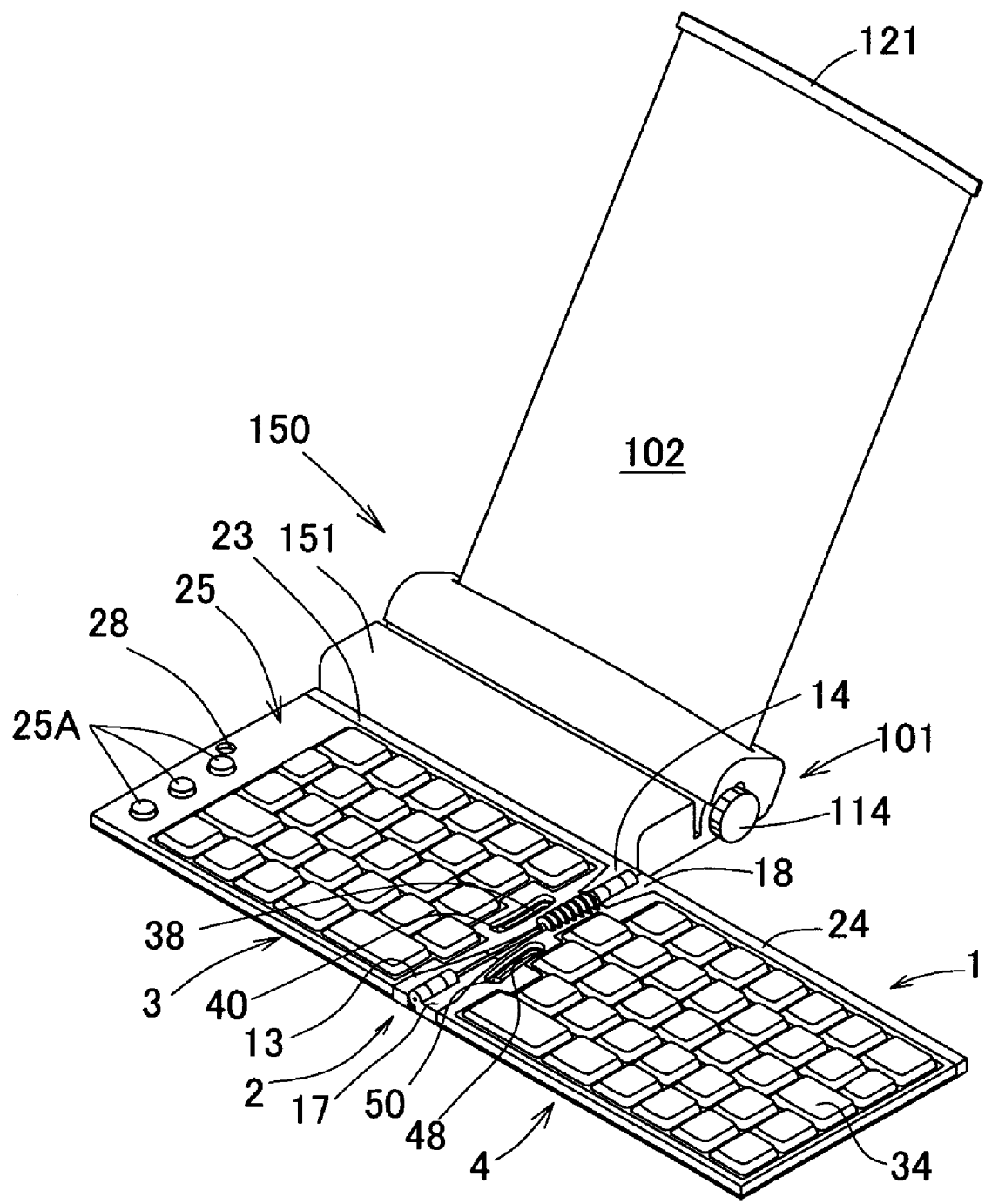
FIG. 15 is a perspective view of a notebook-size personal computer.

Using the above mentioned keyboard 1 and flexible display 102, a foldable notebook-size personal computer as shown in FIG. 15 can be realized. FIG. 15 is a perspective view of the notebook-size personal computer.

In the notebook-size personal computer 150 in FIG. 15, a computer main unit 151 is united with the first keyboard unit 3 at one side thereof. It is to be noted that the structures of the keyboard 1 and the flexible display 102, and the housing or retracting structure of the flexible display 102 are identical to those in the input device 100. This notebook-size personal computer 150 can also provide the same effects as those in the above mentioned input device 100.

Figure 16:
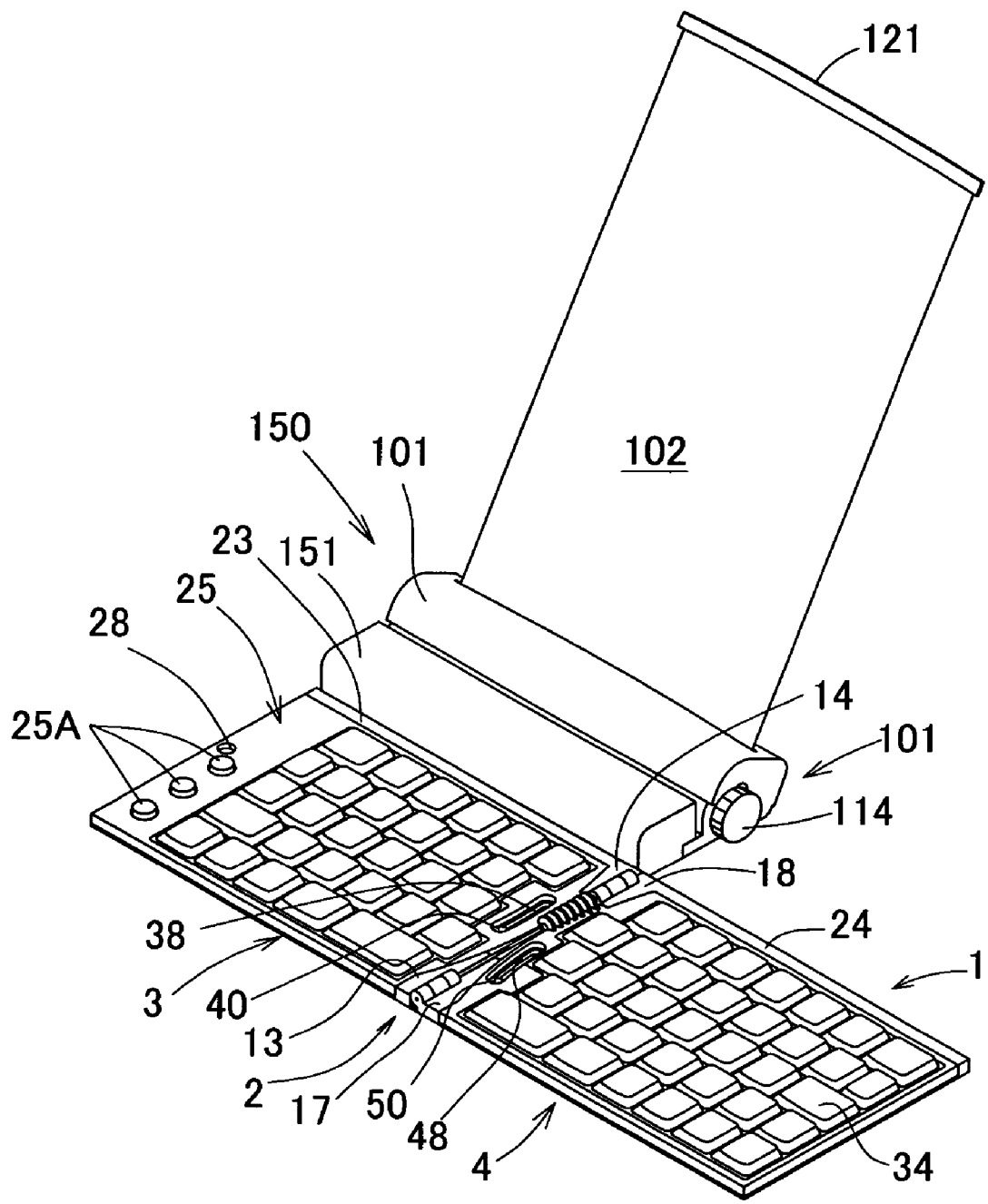
FIG. 16 is an explanatory view showing a state where the housing unit is attached to a main unit of the personal computer.
Figure 17:
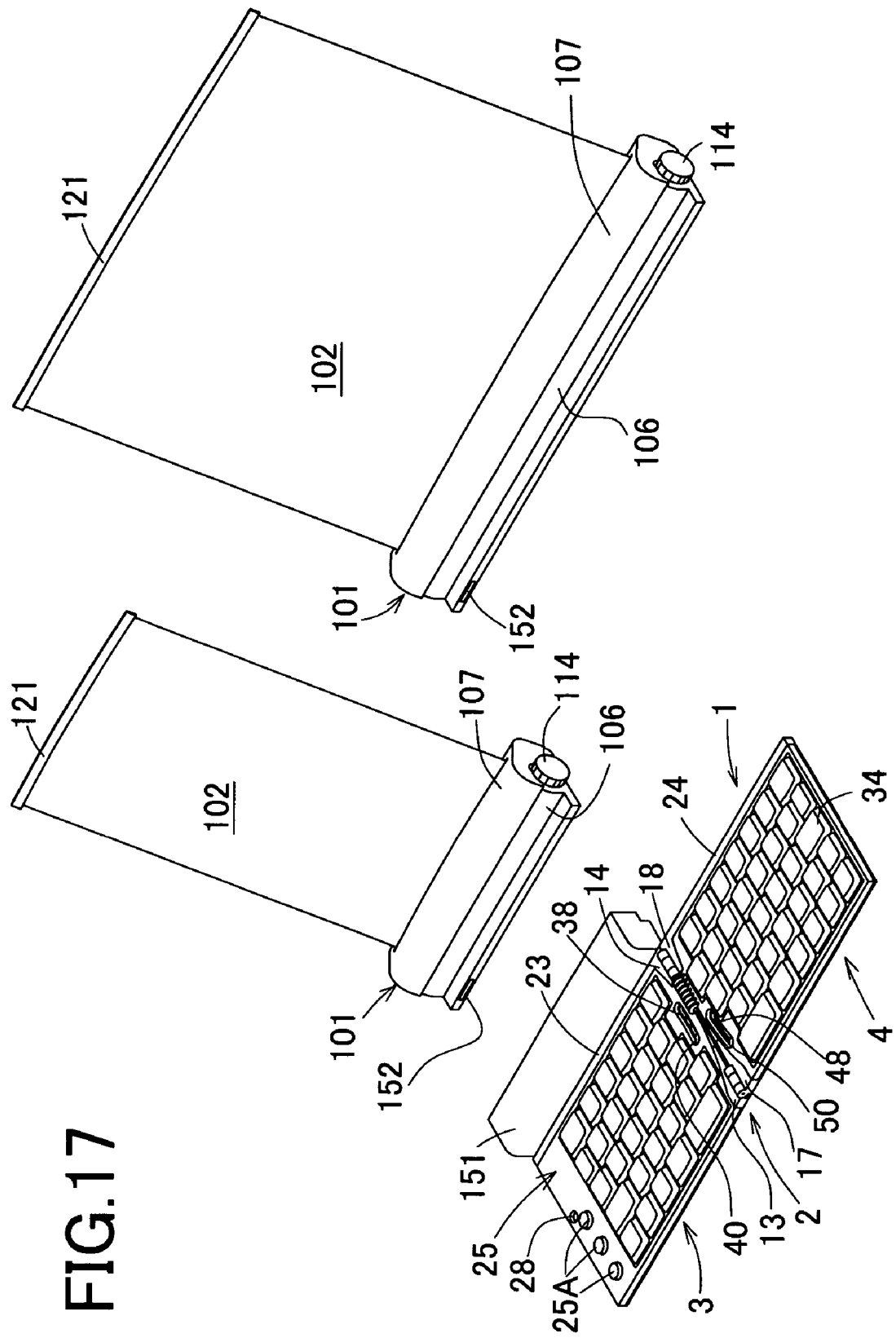
FIG. 17 is an explanatory view showing a state where the housing unit is detached from the main unit.

Next, explanations are made on other embodiments of the input device 100 including a housing unit 101 structured to be attachable/detachable with respect to a keyboard 1. A personal computer 150 is explained as one example of such input device 100, referring to FIGS. 16 and 17. FIG. 16 is an explanatory view showing a state where the housing unit is attached to a main unit of the personal computer; and FIG. 17 is an explanatory view showing a state where the housing unit is detached from the main unit.

In the personal computer 150 shown in FIG. 16, a computer main unit 151 is united with the first keyboard unit 3 at one side thereof. The housing unit 101 is detachably mount to the main unit 151. This structure to detachably mount the housing unit 101 to the main unit 151 may be selected from various types of structures. For example, the main unit 151 is formed with a groove and the housing unit 101 is formed with a projection elastically engageable with the groove so that the housing unit 101 may be attached to or detached from the main unit 151 through one-touch operation.

The detachable computer main unit 151 and housing unit 101 are provided with infrared data communication parts 152 respectively. Only the infrared data communication part 152 provided in the housing unit 101 is shown in FIG. 17. The computer main unit 151 connected with the keyboard 1 in this way can transmit and receive various kinds of data through the infrared data communication part 152. Various kinds of information input with the keyboard 1 are displayed on the flexible display 102 through the computer main unit 151, the infrared data communication part 152, and the contact terminal 104 of the connector 103 and the contact terminal 105 of the flexible display 102.

As explained above, the housing unit 101 which houses the flexible display 102 is structured to be attachable/detachable with respect to the computer main unit 151, and the keyboard 1 and the flexible display 102 communicate with each other by infrared data communication through the computer main unit 151. Accordingly, the housing unit 101 detached from the computer main unit 151 can be set in a place apart from the keyboard 1. In this separate state, when the flexible display is drawn upward from the housing unit 101 and the keyboard 1 is operated as needed, the flexible display 102 can display various kinds of input information. The thus constructed personal computer 150 can be used as a tool for presentations with excellent portability.

Since the keyboard 1 and the flexible display 102 can communicate with each other by infrared data communication by way of the computer main unit 151 as mentioned above, preparation of a plurality of housing units 101 containing different-sized flexible displays 102 respectively enables simultaneous presentations in plural places with the use of a single keyboard 1.

The present invention may be embodied in other specific forms without departing from the essential characteristics thereof.

For instance, in the above embodiment, the color organic EL display sheet 119 is used as a display constituting the flexible display 102. The display may be any one of different kinds; for example, a flexible liquid crystal display, a paper like display of an In-Plane type electrophoretic display system, and a so-called electronic paper integrally constructed of an electric circuit and a display medium.

The flexible display 102 may be attached rotatably, directly to one side of the first keyboard unit 3 or the second keyboard unit 4, not through the housing unit 101.

Furthermore, in the above embodiment, the keyboard 1 is constructed of the two keyboard units 3 and 4 which are foldable into two. Alternatively, the keyboard 1 may be constructed of more than two keyboard units to be foldable into three or four and the housing unit 101 may be connected with one edge of any one of the keyboard units.

Although the data communication between the computer main unit 151 and the housing unit 101 is conducted through the infrared data communication part 152 in the examples in FIGS. 16 and 17, any communication method other than the infrared communication, e.g. wireless communication, may be adopted. Furthermore, the housing unit 101 in the above examples is structured detachably to the computer main unit 151, but it may alternatively be constructed detachably to the first keyboard unit 3 or the second keyboard unit 4.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An input device including:
    a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard;
    a housing main body disposed at one side of the first or second keyboard unit and formed with a hole in an upper surface;
    a flexible display which is windable so as to be housed in a rolled state in the housing main body during nonuse of the display and to be drawn from the housing main body through the hole during use of the display;
    a first contact terminal formed in the flexible display; and
    a connector which is electrically connected with the first and second keyboard units and provided with a second contact terminal,
    the first contact terminal being connected with the second contact terminal of the connector only when the flexible display is drawn out from the housing main body through the hole for use of the flexible display.

2. The input device according to claim 1, wherein the housing main body is attached to one side of the first or second keyboard unit along a direction perpendicular to an axial direction of the connecting part.

3. The input device according to claim 1, wherein the hole formed in the housing main body is a curved elongate hole having a predetermined curvature, and a resilient metallic thin plate is laminated to a rear side of the flexible display, the resilient metallic thin plate being formed to provide a curved surface of a curvature equal to the predetermined curvature of the hole.

4. The input device according to claim 1, wherein the housing main body is constructed to be attachable and detachable with respect to the first or second keyboard unit, and the keyboard and the flexible display in the housing main body are constructed so as to communicate with each other by wireless communication.

5. The input device according to claim 1, wherein the flexible display is constructed of an organic electroluminescence (EL) display.

6. A personal computer including:
    a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard;
    a computer main body disposed at one side of the first or second keyboard unit;
    a housing main body disposed at one side of the computer main body and formed with a hole in an upper surface;
    a flexible display which is windable so as to be housed in a rolled state in the housing main body during nonuse of the display and to be drawn from the housing main body through the hole during use of the display;
    a first contact terminal formed in the flexible display; and
    a connector which is electrically connected with the first and second keyboard units and provided with a second contact terminal,
    the first contact terminal being connected with the second contact terminal of the connector only when the flexible display is drawn out from the housing main body through the hole for use of the flexible display.

7. An input device including:
    a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard;
    a housing main body disposed at one side of the first or second keyboard unit and formed with a hole in an upper surface;
    a flexible display which is windable so as to be housed in a rolled state in the housing main body during nonuse of the display and to be drawn from the housing main body through the hole during use of the display;
    a first contact terminal formed in the flexible display; and
    a connector which is electrically connected with the first and second keyboard units and provided with a second contact terminal,
    the first contact terminal being connected with the second contact terminal of the connector only when the flexible display is drawn out from the housing main body through the hole for use of the flexible display:
    wherein the hole formed in the housing main body is a curved elongate hole having a predetermined curvature, and a resilient metallic thin plate is laminated to a rear side of the flexible display, the resilient metallic thin plate being formed to provide a curved surface of a curvature equal to the predetermined curvature of the hole.

8. The input device according to claim 7, wherein the housing main body is attached to one side of the first or second keyboard unit along a direction perpendicular to an axial direction of the connecting part.

9. The input device according to claim 7, wherein the housing main body is constructed to be attachable and detachable with respect to the first or second keyboard unit, and the keyboard and the flexible display in the housing main body are constructed so as to communicate with each other by wireless communication.

10. The input device according to claim 7, wherein the flexible display is constructed of an organic electroluminescence (EL) display.

11. A personal computer provided with an input device, wherein the input device includes:
a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard;
a computer main body disposed at one side of the first or second keyboard unit;
a housing main body disposed at one side of the computer main body and formed with a hole in an upper surface;
a flexible display which is windable so as to be housed in a rolled state in the housing main body during nonuse of the display and to be drawn from the housing main body through the hole during use of the display, and
a first contact terminal formed in the flexible display: and
a connector which is electrically connected with the first and second keyboard units and provided with a second contact terminal.
the first contact terminal being connected with the second contact terminal of the connector only when the flexible display is drawn out from the housing main body through the hole for use of the flexible display;
the hole formed in the housing main body is a curved elongate hole having a predetermined curvature, and a resilient metallic thin plate is laminated to a rear side of the flexible display, the resilient metallic thin plate being formed to provide a curved surface of a curvature equal to the predetermined curvature of the hole.

12. An input device including:
a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard;
a housing main body disposed at one side of the first or second keyboard unit and formed with a hole in an upper surface;
a flexible display which is windable so as to be housed in a rolled state in the housing main body during nonuse of the display and to be drawn from the housing main body through the hole during use of the display,
a first contact terminal formed in the flexible display; and
a connector which is electrically connected with the first and second keyboard units and provided with a second contact terminal,
the first contact terminal being connected with the second contact terminal of the connector only when the flexible display is drawn out from the housing main body through the hole for use of the flexible display;
wherein the housing main body is constructed to be attachable and detachable with respect to the first or second keyboard unit, and the keyboard and the flexible display in the housing main body are constructed so as to communicate with each other by wireless communication.

13. The input device according to claim 12, wherein the housing main body is attached to one side of the first or second keyboard unit along a direction perpendicular to an axial direction of the connecting part.

14. The input device according to claim 12, wherein the hole formed in the housing main body is a curved elongate hole having a predetermined curvature, and a resilient metallic thin plate is laminated to a rear side of the flexible display, the resilient metallic thin plate being formed to provide a curved surface of a curvature equal to the predetermined curvature of the hole.

15. The input device according to claim 12, wherein the flexible display is constructed of an organic electroluminescence (EL) display.

16. A personal computer provided with an input device, wherein the input device includes:
a foldable keyboard including a first keyboard unit, a second keyboard unit, and a rotatable connecting part provided between the first and second keyboard units, so that the first and second keyboard units are rotated to come apart from each other into an unfolded, horizontally arranged state through the connecting part for use of the keyboard, while the first and second keyboard units are rotated to come close to each other into a closed, folded state through the connecting part for nonuse of the keyboard;
a computer main body disposed at one side of the first or second keyboard unit;
a housing main body disposed at one side of the computer main body and formed with a hole in an upper surface;
a flexible display which is windable so as to be housed in a rolled state in the housing main body during nonuse of the display and to be drawn from the housing main body through the hole during use of the display, and
a first contact terminal formed in the flexible display; and
a connector which is electrically connected with the first and second keyboard units and provided with a second contact terminal.
the first contact terminal being connected with the second contact terminal of the connector only when the flexible display is drawn out from the housing main body through the hole for use of the flexible display;
the housing main body is constructed to be attachable and detachable with respect to the first or second keyboard unit, and the keyboard and the flexible display in the housing main body are constructed so as to communicate with each other by wireless communication.

* * * * *